United States Patent
Aitken et al.

(10) Patent No.: US 11,919,807 B2
(45) Date of Patent: Mar. 5, 2024

(54) HIGH REFRACTIVE INDEX PHOSPHATE GLASS

(71) Applicant: CORNING INCORPORATED, Corning, NY (US)

(72) Inventors: Bruce Gardiner Aitken, Corning, NY (US); Lina Ma, Corning, NY (US)

(73) Assignee: Corning Incorporated, Corning, NY (US)

( * ) Notice: Subject to any disclaimer, the term of this patent is extended or adjusted under 35 U.S.C. 154(b) by 165 days.

(21) Appl. No.: 17/411,188

(22) Filed: Aug. 25, 2021

(65) Prior Publication Data

US 2022/0106225 A1 Apr. 7, 2022

Related U.S. Application Data

(63) Continuation of application No. 16/700,061, filed on Dec. 2, 2019, now Pat. No. 11,124,445.

(60) Provisional application No. 62/776,668, filed on Dec. 7, 2018.

(51) Int. Cl.
  *C03C 3/21* (2006.01)
  *C03C 3/16* (2006.01)
  *C03C 3/17* (2006.01)

(52) U.S. Cl.
  CPC ............. *C03C 3/21* (2013.01); *C03C 3/16* (2013.01); *C03C 3/17* (2013.01)

(58) Field of Classification Search
  CPC ............. C03C 3/21; C03C 3/16; C03C 3/17
  See application file for complete search history.

(56) References Cited

U.S. PATENT DOCUMENTS

| | | | |
|---|---|---|---|
| 6,995,101 B2 | 2/2006 | Zou et al. | |
| 7,060,640 B2 | 6/2006 | Ogino et al. | |
| 7,309,670 B2 | 12/2007 | Fujiwara et al. | |
| 7,501,366 B2 | 3/2009 | Wolff et al. | |
| 7,553,785 B2 | 6/2009 | Ritter et al. | |
| 7,635,521 B2 | 12/2009 | Aitken et al. | |
| 7,638,448 B2 | 12/2009 | Wolff et al. | |
| 7,767,605 B2 | 8/2010 | Ogino et al. | |
| 8,716,157 B2 | 5/2014 | Fujiwara et al. | |
| 9,018,114 B2 | 4/2015 | Oogaki | |
| 11,124,445 B2 * | 9/2021 | Aitken | C03C 3/16 |
| 2002/0073735 A1 | 6/2002 | Hayashi et al. | |
| 2008/0039309 A1 | 2/2008 | Wolff et al. | |
| 2012/0142516 A1 | 6/2012 | Fujiwara | |
| 2016/0214881 A1 | 7/2016 | Mikami | |
| 2019/0322571 A1 | 10/2019 | Aitken | |

FOREIGN PATENT DOCUMENTS

| | | | |
|---|---|---|---|
| CN | 1915876 A | 2/2007 | |
| CN | 101130450 A | 2/2008 | |
| DE | 102007008300 A1 | 2/2008 | |
| FR | 2889844 A1 | 2/2007 | |
| JP | 2003-165743 A | 6/2003 | |
| JP | 2008-133148 A | 6/2008 | |
| JP | 2013-227197 A | 11/2013 | |
| JP | 2013227197 A * | 11/2013 | |
| JP | 2014-047095 A | 3/2014 | |
| JP | 2016-179918 A | 10/2016 | |
| WO | 2002/002470 A1 | 1/2002 | |
| WO | 2008/065937 A1 | 6/2008 | |
| WO | WO-2018140390 A1 * | 8/2018 | ............... C03C 3/21 |

OTHER PUBLICATIONS

Chinese Patent Application No. 201980080965.7, Office Action, dated Aug. 17, 2022, 20 pages, (10 pages of English Translation and 10 pages of Original Copy); Chinese Patent Office.
Chinese Patent Application No. 201980080965.7, Office Action, dated Jan. 13, 2023, 4 pages Chinese Patent Office.
Chu et al; "Optical and Structural Properties of Sr—Nb-Phosphate Glasses" ; J. Non-Crystalline Solids; 357 (2011) pp. 939-945.
Ghusen et al; "Color Bleaching and Oxygen Diffusion in a Niobium Phosphate Glass" ; J. Non-Crystalline Solids; 401:96-100 (2014).
International Search Report and Written Opinion of the European International Searching Authority; PCT/US2019/063958; dated Feb. 28, 2020; 15 pgs.
Lee et al; "Structural Characterizations and Optical Properties of New Li—Sr—Nb-Phosphate Glasses" ; Materials Chemistry and Physics 144 (2014) pp. 235-241.
Martinelli et al; "Synthesis and Properties of Niobium Barium Phosphate Glasses"; J. Non-Crystalline Solids; 263&264: 263-270. (2000).
Zaine Teixeira et al. "Structure, thermal behaviour,chemical durability, and optical properties of the Na2O—Al2O3—TiO2—Nb2O5—P2O5 glass system," journal of the American Ceramaic Society 90(1) 2007 , pp. 256-263.

* cited by examiner

*Primary Examiner* — Elizabeth A. Bolden
(74) *Attorney, Agent, or Firm* — Kevin L. Bray

(57) ABSTRACT

Disclosed herein are glasses that present several advantages over traditional glass compositions used in optical applications. The glasses disclosed herein have a low devitrification tendency and can be processed by melt quenching and formed into macroscopic components. The glasses have high glass thermal stability indices and are chemically durable. The glasses disclosed herein are transparent when heat treated in air or oxygen and have high refractive indices and low density, as well, making them suitable for optical applications.

18 Claims, 5 Drawing Sheets

HIGH REFRACTIVE INDEX PHOSPHATE GLASS

This application is a continuation of and claims the benefit of priority to U.S. application Ser. No. 16/700,061, filed on Dec. 2, 2019, which claims the benefit of priority to U.S. Provisional Application Ser. No. 62/776,668 filed on Dec. 7, 2018, the contents of which are relied upon and incorporated herein by reference in their entirety.

BACKGROUND

The demand of optical glasses with high refractive index (e.g., greater than 1.70) and low density has increased with the growing market for devices used in optical displays for augmented reality devices or virtual reality devices, optical fibers, and optical lenses. The other requirements for these optical glasses are good glass formability, relatively low production cost, and good chemical durability to withstand chemical cleaning and various environmental conditions. The glass compositions described herein possess desirable properties with respect to their manufacture and use in optical articles.

SUMMARY

Disclosed herein are glasses that present several advantages over traditional glass compositions used in optical applications. The glasses disclosed herein have a low devitrification tendency and can be processed by melt quenching and formed into macroscopic components. The glasses have high stability indices and are chemically durable. The glasses disclosed herein are transparent when annealed in air or oxygen and have high refractive indices and low density as well, making them suitable for use in numerous optical articles and applications.

The advantages of the materials, methods, and devices described herein will be set forth in part in the description that follows, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below.

DETAILED DESCRIPTION

Figure 1A:
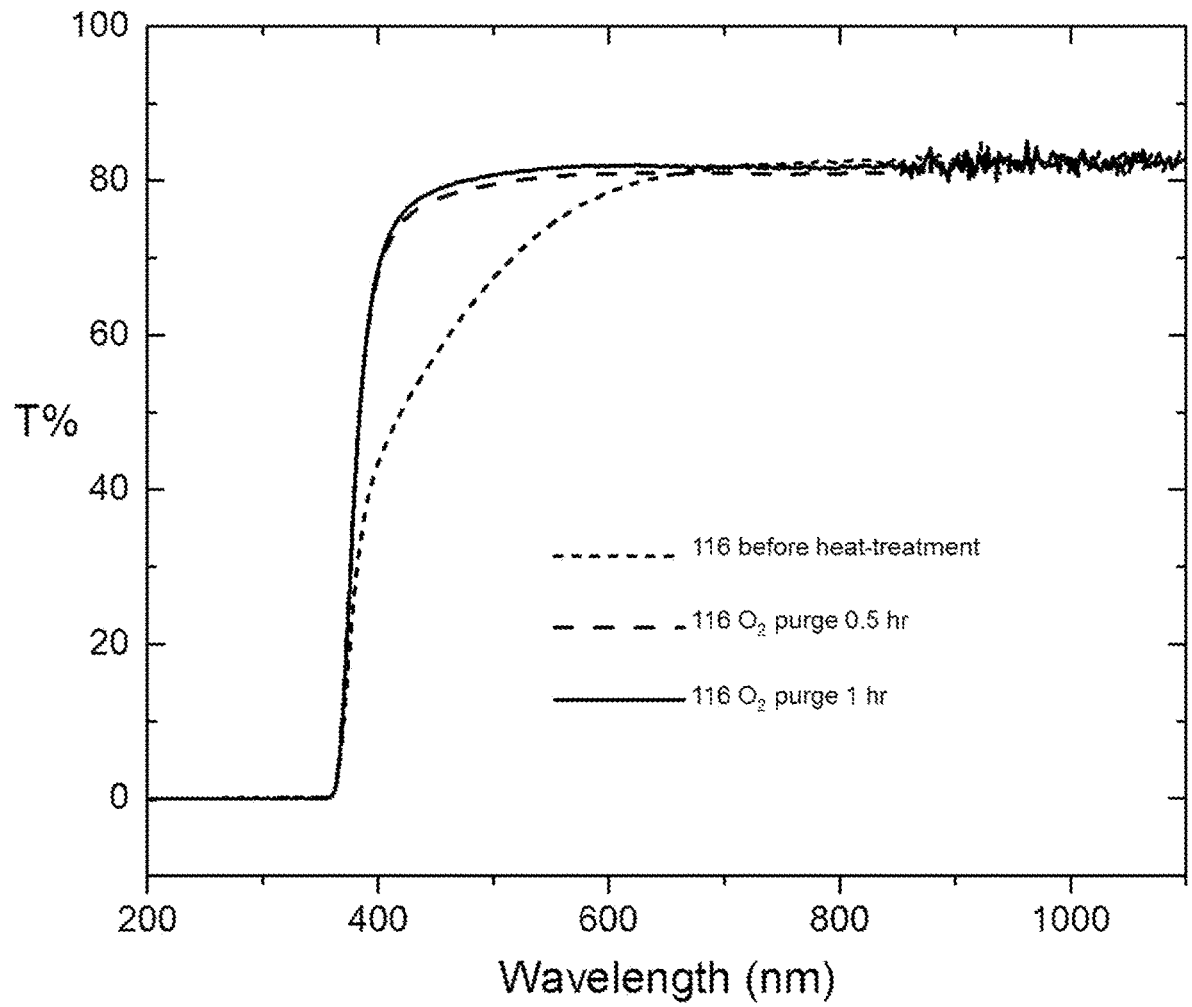
FIGS. 1A and 1B show the transmittance of a glass composition heated at 660° C. with oxygen purge for 0.5 hour and 1 hour (FIG. 1A) and in air at 640° C. for 1 hour (FIG. 1B) compared to the same glass composition that was not heated.

Before the present materials, articles, and/or methods are disclosed and described, it is to be understood that the aspects described below are not limited to specific compounds, synthetic methods, or uses, as such may, of course, vary. It is also to be understood that the terminology used herein is for the purpose of describing particular aspects only and is not intended to be limiting.

In the specification and in the claims that follow, reference will be made to a number of terms that shall be defined to have the following meanings:

It must be noted that, as used in the specification and the appended claims, the singular forms "a," "an," and "the" include plural referents unless the context clearly dictates otherwise. Thus, for example, reference to "a metal oxide" in a glass composition includes mixtures of two or more metal oxides and the like.

"Optional" or "optionally" means that the subsequently described event or circumstance can or cannot occur, and that the description includes instances where the event or circumstance occurs and instances where it does not. For example, the glass compositions described herein may optionally contain an alkaline earth metal oxide, where the alkaline earth metal oxide may or may not be present.

As used herein, the term "about" is used to provide flexibility to a numerical range endpoint by providing that a given numerical value may be "a little above" or "a little below" the endpoint without affecting the desired result. For purposes of the present disclosure, "about" refers to a range extending from 10% below the numerical value to 10% above the numerical value. For example, if the numerical value is 10, "about 10" means between 9 and 11 inclusive of the endpoints 9 and 11.

Throughout this specification, unless the context dictates otherwise, the word "comprise," or variations such as "comprises" or "comprising," will be understood to imply the inclusion of a stated element, integer, step, or group of elements, integers, or steps, but not the exclusion of any other element, integer, step, or group of elements, integers, or steps.

The "refractive index" of a material is a number that describes how light propagates through that material. It is defined by the equation $n=c/v$, where c is the speed of light in a vacuum and v is the speed of light as it propagates through the material. In one aspect, the refractive indices of the materials disclosed herein show little variation over the measured wavelength range and, hence, are characterized by low dispersion.

As used herein, the "glass transition temperature" ($T_g$) of a material characterizes the temperature at which the glass transition occurs in an amorphous material. At temperatures below $T_g$, the material exists in a hard and brittle state and at temperatures above $T_g$, the material exists in a supercooled liquid state. $T_g$ is always lower than the melting temperature of a material's crystalline state, if a crystalline state exists for the material.

As used herein, "devitrification" is the formation of crystalline structures in glass. Devitrification can result from improper cleaning of glass surfaces, during cooling of the melt from melting temperatures, from holding the glass at a high temperature for a long time (which may cause crystals to nucleate), or simply from the tendencies of the raw materials in the glass. In one aspect, simple binary titanium phosphate glasses have a high devitrification tendency. In a further aspect, devitrification can be avoided by using rapid quenching techniques such as, for example, roller quenching. In a still further aspect, the glass compositions disclosed herein have low devitrification tendencies and thus can be quenched to the glassy state using cooling rates that are substantially slower than those associated with roller quenching.

As used herein, "glass thermal stability index" refers to the temperature difference between the onset of crystallization ($T_x$) and the glass transition ($T_g$) (i.e., $T_x$–$T_g$) as measured by differential scanning calorimetry (DSC). The onset crystallization determined by DSC is the onset crystallization peak upon heating of a glass from room temperature to melting temperature at a rate of 10° C./min. Methods for determining the onset of crystallization (Tx) are provided in the Examples. In one aspect, the glass compositions described herein have a high glass thermal stability index. In a further aspect, the glass compositions described herein can have a glass thermal stability index of 100° C. or greater, or 150° C. or greater, or 200° C. or greater. In other aspects, a crystalline state does not exist for the glass composition and the glass thermal stability index is a negative number corresponding to –$T_g$.

"Dispersion" as used herein is a change in the refractive index of a material with wavelength. In one aspect, the glass compositions described herein have lower dispersion than other high refractive index glasses such as, for example, glasses containing lead or bismuth.

"Melt quenching" is a common technique for producing glasses. In melt quenching, raw materials are mixed into a batch and melted; the duration and temperature of the melt depend on the melting points of the individual components. Following melting, the glass can be cast and then annealed near $T_g$ to remove thermal stresses that may remain. Glasses that have been melt quenched can be further processed by sawing, grinding, polishing, and other techniques. In one aspect, the glass compositions disclosed herein can be processed via melt quenching. In a further aspect, the glass compositions disclosed herein can be fabricated into macroscopic pieces.

"Roller quenching" is a rapid quenching technique used in the processing of materials with poor glass forming tendencies into glasses. In roller quenching, the glass melt is poured through rollers. In one aspect, the glass compositions disclosed herein have good glass forming tendencies and do not need to be processed by roller quenching.

"Annealing" as used herein is the process of slowly cooling hot glass after the formation of an object from the glass melts as well as reheating the glass from room temperature to annealing point and keep at annealing point for certain time, and then slowly cooling back to room temperature. In one aspect, annealing can relieve internal stresses introduced during the manufacture of a glass object. In another aspect, the glasses described herein can be strongly colored when formed by conventional melting in air, but can be bleached to transparency by annealing in air or oxygen at elevated temperatures, including temperatures near $T_g$. The "annealing temperature" or "annealing point" of glass is the temperature at which the viscosity of the glass reaches $10^{13.2}$ Poise. In one aspect, at the annealing temperature, the viscosity of the glass is still high enough that the glass can resist external deformation (and any resultant breakage) but becomes just soft enough to relax internal strains. In one aspect, the annealing points of the glasses disclosed herein can range from 450 to 750° C.

A material such as an object formed from a glass composition can change in shape, area, or volume in response to a change in temperature. The "coefficient of thermal expansion" is the degree of expansion divided by the change in temperature and can vary with temperature. Methods for determining the coefficient of thermal expansion are provided in the Examples.

References in the specification and claims to atomic percentages of a particular element in a composition or article denote the molar relationship between the element or component and any other elements or components in the composition or article for which an atomic percentage is expressed. Thus, in a composition containing 2 atomic percent of component X and 5 atomic percent of component Y, X and Y are present at a molar ratio of 2:5, and are present in such a ratio regardless of whether additional components are used in the composition.

As used herein, a plurality of items, structural elements, compositional elements, and/or materials may be presented in a common list for convenience. However, these lists should be construed as though each member of the list is individually identified as a separate and unique member. Thus, no individual member of any such list should be construed as a de facto equivalent of any other member of the same list based solely on its presentation in a common group, without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range was explicitly recited. As an example, a numerical range of "about 1" to "about 5" should be interpreted to include not only the explicitly recited values of about 1 to about 5, but also to include individual values and sub-ranges within the indicated range. Thus, included in this numerical range are individual values such as 2, 3, and 4, the sub-ranges such as from 1-3, from 2-4, from 3-5, from about 1-about 3, from 1 to about 3, from about 1 to 3, etc., as well as 1, 2, 3, 4, and 5, individually. The same principle applies to ranges reciting only one numerical value as a minimum or maximum. Furthermore, such an interpretation should apply regardless of the breadth or range of the characters being described.

Disclosed are materials and components that can be used for, can be used in conjunction with, can be used in preparation for, or are products of the disclosed compositions and methods. These and other materials are disclosed herein, and it is understood that when combinations, subsets, interactions, groups, etc. of these materials are disclosed, that while specific reference to each various individual combination and permutation of these compounds may not be explicitly disclosed, each is specifically contemplated and described herein. For example, if an alkali metal oxide additive is disclosed and discussed, and a number of different alkaline earth metal oxide additives are discussed, each and every combination of alkali metal oxide additive and alkaline earth metal oxide additive that is possible is specifically contemplated unless specifically indicated to the contrary. For example, if a class of alkali metal oxides A, B, and C is disclosed, as well as a class of alkaline earth metal oxide additives D, E, and F, and an example combination of A+D is disclosed, then even if each is not individually recited, each is individually and collectively contemplated. Thus, in this example, each of the combinations A+E, A+F, B+D, B+E, B+F, C+D, C+E, and C+F is specifically contemplated and should be considered from disclosure of A, B, ad C; D, E, and F; and the example combination A+D. Likewise, any subset or combination of these is also specifically contemplated and disclosed. Thus, for example, the sub-group of A+E, B+F, and C+E is specifically contemplated and should be considered from disclosure of A, B, and C; D, E, and F; and the example combination of A+D. This concept applies to all aspects of the disclosure including, but not limited to, steps in methods of making and using the disclosed compositions. Thus, if there are a variety of additional steps that can be performed with any specific embodiment or combination of embodiments of the disclosed methods, each such composition is specifically contemplated and should be considered disclosed.

The term "$R_2O$" refers to alkali metal oxide and is used to represent the combination of all alkali metal oxides in a glass composition. Alkali metal oxides include $Li_2O$, $Na_2O$, $K_2O$, $Rb_2O$, and $Cs_2O$. If only one alkali metal oxide is present in a composition, $R_2O$ refers to that alkali metal oxide. If two or more alkali metal oxides are present in a composition, $R_2O$ refers to all alkali metal oxides collectively. Reference to amount or concentration of $R_2O$ means the combined amount or concentration of all (one or more) alkali metal oxides expressed as mol %.

The term "RO" refers to alkaline earth metal oxide and is used to represent the combination of all alkaline earth metal oxides in a glass composition. Alkaline earth metal oxides include MgO, CaO, SrO, and BaO. If only one alkaline earth metal oxide is present in a composition, RO refers to that alkaline earth metal oxide. If two or more alkaline earth metal oxides are present in a composition, RO refers to all alkaline earth metal oxides collectively. Reference to amount or concentration of RO means the combined amount or concentration of all (one or more) alkaline earth metal oxides expressed as mol %.

Unless otherwise specified, amounts or concentrations described herein for components in a glass composition refer to mol % of components included in the glass composition produced herein.

The glass compositions described herein include phosphorous pentoxide ($P_2O_5$), niobium pentoxide ($Nb_2O_5$), one or more alkali metal oxides ($R_2O$), one or more alkaline earth metal oxides (RO), and one or more optional glass-forming components. As will be discussed in detail below, by varying the relative amounts of each of these components the properties of the glass composition can be modified.

The glass compositions described herein contain $P_2O_5$. In one aspect, the amount of $P_2O_5$ is from about 20 mol % to about 40 mol %. In another aspect, the amount of $P_2O_5$ is about 20, 25, 30, 35, or 40 mol %, where any value can be a lower- and upper-endpoint of a range (e.g., 25 mol % to 40 mol %, 25 mol % to 35 mol %, etc.).

The glass compositions described herein contain $Nb_2O_5$. In one aspect, the amount of $Nb_2O_5$ is from about 10 mol % to about 50 mol %. In a still further aspect, the $Nb_2O_5$ is present at about 10, 15, 20, 25, 30, 35, 40, 45, or 50 mol %, where any value can be a lower- and upper-endpoint of a range (e.g., 15 mol % to 30 mol %, 20 mol % to 30 mol %, etc.). The presence of $Nb_2O_5$ in the glasses described herein contributes to an increase in refractive index of the glass materials.

The glass compositions described herein contain one or more alkali metal oxides ($R_2O$), which includes $Na_2O$, $Li_2O$, $K_2O$, or any combination thereof. In one aspect, the amount of the alkali metal oxide is from about 1 mol % to about 35 mol %. In a still further aspect, the alkali metal oxide is present at about 1, 5, 10, 15, 20, 25, 30, or 35 mol %, where any value can be a lower- and upper-endpoint of a range (e.g., 5 mol % to 15 mol %, 5 mol % to 20 mol %, etc.).

In one aspect, the alkali metal oxide is $Na_2O$ in the amount of 1 mol % to 35 mol %. In another aspect, the alkali metal oxide is $Li_2O$ in the amount of 1 mol % to 15 mol %. In another aspect, the alkali metal oxide is $K_2O$ in the amount of 1 mol % to 10 mol %. In the case when a single alkali metal oxide is present in the glass composition, the amount of alkali metal oxide is from 1 mol % to 35 mol %. In a further aspect, the alkali metal oxide is $Na_2O$ in the amount of 1 mol % to 35 mol %, $Li_2O$ in the amount of 1 mol % to 15 mol %, and $K_2O$ in the amount of 1 mol % to 10 mol %, where the sum of $R_2O$ is from about 1 mol % to about 35 mol %.

The glass compositions described herein contain one or more alkaline earth metal oxides (RO), which includes CaO, BaO, MgO, SrO, or any combination thereof. In one aspect, the amount of the alkaline earth metal oxide is from about 5 mol % to about 40 mol %. In a still further aspect, the alkali earth metal oxide is present at about 5, 10, 15, 20, 25, 30, 35, or 40 mol %, where any value can be a lower- and upper-endpoint of a range (e.g., 1 mol % to 15 mol %, 5 mol % to 20 mol %, etc.).

In one aspect, the alkaline earth metal oxide is BaO in the amount of 1 mol % to 25 mol %. In another aspect, the alkaline earth metal oxide is CaO in the amount of 1 mol % to 20 mol %. In another aspect, the alkaline earth metal oxide is MgO in the amount of 1 mol % to 15 mol %. In another aspect, the alkaline earth metal oxide is SrO in the amount of 1 mol % to 30 mol %. In the case when a single alkaline earth metal oxide is present in the glass composition, the amount of single alkaline earth metal oxide is from 5 mol % to 40 mol %. In a further aspect, the alkaline earth metal oxide is BaO in the amount of 1 mol % to 25 mol % and CaO in the amount of 1 mol % to 20 mol %, where the sum of BaO and CaO is from 1 mol % to 40 mol %. In another aspect, the alkaline earth metal oxide is BaO in the amount of 1 mol % to 25 mol %, CaO in the amount of 1 mol % to 20 mol %, and SrO in the amount of 1 mol % to 30 mol %, where the sum of BaO, CaO, and SrO is from 5 mol % to 40 mol %.

The amount of $P_2O_5$, alkali metal oxide, and alkaline earth metal oxide can be varied in order modify the properties of the glass composition. In one aspect, the molar ratio of $R_2O/(R_2O+RO)$ is greater than 0.25. In another aspect, the molar ratio of $R_2O/(R_2O+RO)$ is greater than 0.25, or 0.5, 0.75, 1, 2, 3, 4, 5, 6, 7, 8, 9, or 10, where any value can be a lower- and upper-endpoint of a range (e.g., greater than 0.25 to 2, 0.5 to 5, etc.). Here and throughout the present description, $R_2O$ and RO can include one or more alkali metal oxides and alkaline earth metal oxides, respectively. Not wishing to be bound by theory, when $R_2O/(R_2O+RO)$ is greater than 0.25 the transmittance of the glass composition improves.

In one aspect, when the glass composition includes $R_2O$ and RO, the molar ratio of $(R_2O+RO)/P_2O_5$ is greater than or equal to 1. In another aspect, the molar ratio of $(R_2O+RO)/P_2O_5$ is greater than 1, or 2, 3, 4, 5, 6, 7, 8, 9, or 10, where any value can be a lower- and upper-endpoint of a range (e.g., greater than 1 to 3, 2 to 5, etc.). In other aspects, when the glass composition includes $R_2O$ and RO, the molar ratio of $(R_2O+RO)/P_2O_5$ is less than or equal to 1.

In one aspect, when the glass composition includes RO and not $R_2O$, the molar ratio of $RO/P_2O_5$ is greater than or equal to 1. In another aspect, the molar ratio of $RO/P_2O_5$ is greater than 1, or 2, 3, 4, 5, 6, 7, 8, 9, or 10, where any value can be a lower- and upper-endpoint of a range (e.g., greater than 1 to 3, 2 to 5, etc.). In other aspects, when the glass composition includes RO and not R$_2$O, the molar ratio of RO/P$_2$O$_5$ is less than or equal to 1.

In one aspect, when the glass composition includes R$_2$O and not RO, the molar ratio of R$_2$O/P$_2$O$_5$ is greater than or equal to 1. In another aspect, the molar ratio of R$_2$O/P$_2$O$_5$ is greater than 1, or 2, 3, 4, 5, 6, 7, 8, 9, or 10, where any value can be a lower- and upper-endpoint of a range (e.g., greater than 1 to 3, 2 to 5, etc.). In other aspects, when the glass composition includes R$_2$O and not RO, the molar ratio of R$_2$O/P$_2$O$_5$ is less than or equal to 1.

In one aspect, the glass compositions described herein contain TiO$_2$. In one aspect, the amount of TiO$_2$ is from about 1 mol % to about 30 mol %. In a still further aspect, TiO$_2$ is present at about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 mol %, where any value can be a lower- and upper-endpoint of a range (e.g., 1 mol % to 15 mol %, 5 mol % to 20 mol %, etc.).

In one aspect, the glass compositions described herein contain WO$_3$. In one aspect, the amount of WO$_3$ is from about 1 mol % to about 15 mol %. In a still further aspect, WO$_3$ is present at about 1, 2, 3, 4, 5, 6, 7, 8, 9, 10, 11, 12, 13, 14, or 15 mol %, where any value can be a lower- and upper-endpoint of a range (e.g., 1 mol % to 5 mol %, 5 mol % to 10 mol %, 10 mol % to 15 mol %, etc.).

In one aspect, when the glass composition includes TiO$_2$ and/or WO$_3$, the sum of Nb$_2$O$_5$ with TiO$_2$ and/or WO$_3$ is in the amount of 20 mol % to 50 mol %. In a still further aspect, the sum of Nb$_2$O$_5$ with TiO$_2$ and/or WO$_3$ is at about 20, 25, 30, 35, 40, 45, or 50 mol %, where any value can be a lower- and upper-endpoint of a range (e.g., 20 mol % to 30 mol %, 30 mol % to 40 mol %, etc.).

In one aspect, the glass composition includes ZnO. In this aspect, the amount of ZnO is from 0.5 mol % to about 20 mol %, or is about 0.5, 1, 2, 3, 4, 5, 10, 15, or 20 mol %, where any value can be a lower- and upper-endpoint of a range (e.g., 1 mol % to 15 mol %, 5 mol % to 10 mol %, etc.). In one aspect, the sum of RO, R$_2$O, and ZnO is in the amount of 30 mol % to 60 mol %, or is about 30, 25, 40, 45, 50, 55, or 60 mol %, where any value can be a lower- and upper-endpoint of a range (e.g., 30% to 45%, 40% to 55%, etc.).

In another aspect, the glass composition includes Al$_2$O$_3$. In this aspect, the amount of Al$_2$O$_3$ is greater than 0 mol % and less than or equal to about 5 mol %, or is about 1, 2, 3, 4, or 5 mol %, where any value can be a lower- and upper-endpoint of a range (e.g., 1 mol % to 5 mol %, 2 mol % to 4 mol %, etc.).

In another aspect, the glass composition includes SnO$_2$. In this aspect, the amount of SnO$_2$ is greater than 0 mol % and less than or equal to about 2 mol %, or is about 0.1, 0.25, 0.5, 0.75, 1.0, 1.25, 1.5, 1.75, or 2.0 mol %, where any value can be a lower- and upper-endpoint of a range (e.g., 0.1 mol % to 2.0 mol %, 0.25 mol % to 1.75 mol %, etc.).

In one aspect, the glass compositions described herein further contain one or more metal oxides selected from the group consisting of Rb$_2$O, Cs$_2$O, CdO, MnO$_2$, Y$_2$O$_3$, La$_2$O$_3$, HfO$_2$, Ta$_2$O$_5$, ZrO$_2$, Ga$_2$O$_3$, SiO$_2$, GeO$_2$, Sb$_2$O$_3$, Bi$_2$O$_3$, and combination thereof. In another aspect, the glass compositions contain one, two, three, or four metal oxides from those listed above. In certain aspects, the glass compositions described herein do not include SiO$_2$, Al$_2$O$_3$, MgO, TiO$_2$, or any combination thereof. In another aspect, the glass compositions described herein do not include B$_2$O$_3$.

In one aspect, a first glass composition includes
 (a) P$_2$O$_5$ in an amount of 15 mol % to 40 mol %;
 (b) Nb$_2$O$_5$ is in an amount of 10 mol % to 50 mol %;
 (c) an alkali metal oxide (R$_2$O) in an amount of 1 mol % to 35 mol %; and
 (d) at least two alkaline earth metal oxides (RO) in a combined amount of 5 mol % to 40 mol %,
wherein the glass composition does not include ZnO and B$_2$O$_3$.

In one aspect, with respect to the first glass composition above, in another aspect the amount of P$_2$O$_5$ is from 25 mol % to 35 mol %; the amount of Nb$_2$O$_5$ is from 20 mol % to 35 mol %; the amount of R$_2$O is from 10 mol % to 35 mol %, and the amount of RO is from 20 mol % to 40 mol %. In a further aspect, the first glass composition includes WO$_3$ in the amount from about 1 mol % to about 15 mol % and/or TiO$_2$ in the amount from about 1 mol % to about 20 mol %, wherein the sum of Nb$_2$O$_5$ with TiO$_2$ and/or WO$_3$ is in the amount of 20 mol % to 40 mol %.

In one aspect, with respect to the first glass composition above, R$_2$O is Na$_2$O in the amount of 1 mol % to 15 mol %, Li$_2$O in the amount of 1 mol % to 15 mol %, and K$_2$O is in the amount of 1 mol % to 10 mol %, BaO is in the amount of 1 mol % to 25 mol %, CaO is in the amount of 1 mol % to 25 mol %, and SrO is in the amount of 1 mol % to 25 mol %.

In one aspect, a second glass composition includes
 (a) P$_2$O$_5$ in an amount of 15 mol % to 40 mol %;
 (b) Nb$_2$O$_5$ is in an amount of 10 mol % to 50 mol %;
 (c) at least one alkali metal oxide (R$_2$O) in an amount of 5 mol % to 35 mol %; and
wherein the glass composition does not include ZnO, B$_2$O$_3$, or an alkaline earth metal oxide (RO).

In one aspect, with respect to the second glass composition above, Nb$_2$O$_5$ is in the amount of 30 mol % to 40 mol % and TiO$_2$ in the amount of 5 mol % to 15 mol %, P$_2$O$_5$ is in an amount of 20 mol % to 30 mol %, and R$_2$O is Na$_2$O in the amount of 5 mol % to 40 mol %, Li$_2$O is in the amount of 5 mol % to 40 mol %, K$_2$O is in the amount of 5 mol % to 40 mol %, or any combination thereof of R$_2$O.

In one aspect, a third glass composition includes
 (a) P$_2$O$_5$ in an amount of 15 mol % to 40 mol %;
 (b) Nb$_2$O$_5$ is in an amount of 10 mol % to 50 mol %;
 (c) at least one alkaline earth metal oxide (RO) in an amount of 5 mol % to 40 mol %;
wherein the glass composition does not include ZnO, B$_2$O$_3$, or an alkali metal oxide (R$_2$O).

In one aspect, with respect to the third glass composition above, Nb$_2$O$_5$ is in the amount of 30 mol % to 40 mol %, TiO$_2$ is in the amount of 5 mol % to 15 mol %, P$_2$O$_5$ is in an amount of 20 mol % to 30 mol %, BaO is in the amount of 5 mol % to 20 mol %, CaO is in the amount of 1 mol % to 10 mol %, and SrO is in the amount of 5 mol % to 20 mol %.

In one aspect, a fourth glass composition includes
 (a) P$_2$O$_5$ in an amount of 20 mol % to 40 mol %;
 (b) Nb$_2$O$_5$ is in an amount of 10 mol % to 50 mol %;
 (c) an alkali metal oxide (R$_2$O) in an amount of 1 mol % to 35 mol %;
 (d) an alkaline earth metal oxide (RO) in an amount of 5 mol % to 40 mol %,
wherein the glass composition does not include B$_2$O$_3$.

In one aspect, with respect to the fourth glass composition above, P$_2$O$_5$ is in the amount of 25 mol % to 35 mol %; Nb$_2$O$_5$ is in the amount of 20 mol % to 35 mol %; ZnO is in the amount of 5 mol % to 25 mol %; R$_2$O is in the amount of 10 mol % to 35 mol %, and RO is in the amount of 20 mol % to 40 mol %. In a further aspect, the fourth glass composition includes WO$_3$ in the amount from about 1 mol % to about 15 mol % and/or TiO$_2$ in the amount from about 1 mol % to about 20 mol %, wherein the sum of $Nb_2O_5$ with $TiO_2$ and/or $WO_3$ is in the amount of 20 mol % to 40 mol %.

In one aspect, a fifth glass composition includes
(a) $P_2O_5$ in an amount of 20 mol % to 40 mol %;
(b) $Nb_2O_5$ is in an amount of 10 mol % to 50 mol %; and
(c) at least one alkali metal oxide ($R_2O$) in an amount of 5 mol % to 35 mol %;
wherein the glass composition does not include $B_2O_3$ or an alkaline earth metal oxide (RO).

In one aspect, with respect to the fifth glass composition above, $Nb_2O_5$ is in the amount of 30 mol % to 40 mol %, $TiO_2$ is in the amount of 5 mol % to 15 mol %, $P_2O_5$ is in an amount of 20 mol % to 35 mol %, ZnO is in the amount of 1 mol % to 15 mol %, and $R_2O$ is in the amount of 1 mol % to 35 mol %, where $R_2O$ is $Na_2O$, $Li_2O$, $K_2O$, or any combination thereof.

In one aspect, a sixth glass composition includes
(a) $P_2O_5$ in an amount of 20 mol % to 40 mol %;
(b) $Nb_2O_5$ is in an amount of 10 mol % to 50 mol %; and
(c) at least one alkaline earth metal oxide (RO) in an amount of 5 mol % to 40 mol %;
wherein the glass composition does not include $B_2O_3$ or an alkali metal oxide ($R_2O$).

In one aspect, with respect to the sixth glass composition above, $Nb_2O_5$ is in the amount of 30 mol % to 40 mol %, $TiO_2$ is in the amount of 5 mol % to 15 mol %, $P_2O_5$ is in an amount of 20 mol % to 35 mol %, ZnO is in the amount of 1 mol % to 15 mol %, and RO is in the amount of 5 mol % to 40 mol %, where RO is BaO, CaO, SrO, or any combination thereof.

The glass compositions described herein can be prepared using techniques known in the art. In one aspect, the glass compositions disclosed herein can be prepared by melt quenching. In one aspect, $P_2O_5$ can be added as phosphoric acid ($H_3PO_4$) in combination with the additional glass-forming components. Further in this aspect, when phosphoric acid is added, the batch materials can be calcined at 350° C. to 400° C. prior to melting. In another aspect, $P_2O_5$ can be added as anhydrous phosphorus pentoxide. In one aspect, the batch materials are melted at 900° C. to 1,300° C. In another aspect, the batch materials are melted in platinum crucibles.

The glass compositions described herein have a refractive index suitable for the use in optical articles. In one aspect, the glass compositions have a refractive index of at least 1.75 at 587.6 nm (D-line) at 25° C., or a refractive index at 587.6 nm at 25° C. of about 1.75, 1.80, 1.85, 1.90, 1.95, or 2.00, where any value can be a lower- and upper-endpoint of a range (e.g., 1.75 to 1.95, 1.90 to 2.00, etc.).

The glass compositions described herein have a density suitable for the use in optical articles. The density is sufficiently low such that they can be used in virtual reality or augmented reality headsets and other optical articles. In one aspect, the glass compositions have a density of less than or equal to 4.0 g/cm³, or a density of 3.5 g/cm³, 3.6 g/cm³, 3.7 g/cm³, 3.8 g/cm³, 3.9 g/cm³, or 4.0 g/cm³, where any value can be a lower- and upper-endpoint of a range (e.g., 3.5 g/cm³ to 3.9 g/cm³, 3.75 g/cm³ to 4.0 g/cm³, etc.).

The glass compositions described herein have a glass thermal stability index that permits the manufacture of optical articles using a number of different glass-making techniques. Not wishing to be bound by theory, the greater the glass thermal stability index the larger the window exists for glass processing with less chance of devitrification. In one aspect, the glass compositions have a glass thermal stability index of greater than or equal to 200° C., greater than or equal to 225° C., or a glass thermal stability index of 200° C., 210° C., 220° C., 230° C., 240° C., 250° C., 260° C., 270° C., 280° C., 290° C., or 300° C., where any value can be a lower- and upper-endpoint of a range (e.g., 200° C. to 300° C., 220° C. to 270° C., etc.).

In certain aspects, the glass composition does not crystallize when heated at the rate of 10° C./min normally utilized in the characterization by differential scanning calorimetry. In these aspects, there is no value for $T_x$ and the glass composition does not have a glass thermal stability index as defined herein. With respect to these glass compositions, they are desirable from the standpoint of their forming characteristics, especially when the forming technique used requires a reheating step.

In one aspect, the glass compositions described herein have an Abbe number of at least 20, or from 20 to 40. In another aspect, the Abbe number is about 20, 21, 22, 23, 24, 25, 26, 27, 28, 29, 30, 31, 32, 33, 34, 35, 36, 37, 38, 39, or 40, where any value can be a lower- and upper-endpoint of a range (e.g., 25 to 35, 30 to 40, etc.).

In one aspect, the glass compositions disclosed herein have annealing points of from about 450° C. to about 750° C. In another aspect, the annealing point of the glass composition is about 450, 475, 500, 525, 550, 575, 600, 625, 650, 675, 700, 725, or 750, ° C., where any value can be a lower- and upper-endpoint of a range (e.g., 450° C. to 700° C., 500 to 650° C., 600° C. to 700° C., 650 to 750° C., etc.).

In one aspect, the glass compositions described herein have a coefficient of thermal expansion of from about 6.0 ppm/° C. to about 12.0 ppm/° C. at each temperature over a range extending from room temperature to 300° C. In one aspect, the coefficient of thermal expansion is about 7.5, 8, 8.5, 9, 9.5, 10, 10.5, or 11 ppm/° C., where any value can be a lower- and upper-endpoint of a range (e.g., 8 to 10 ppm/° C., 8.5 to 10.5 ppm/° C., etc.).

In one aspect, the glass compositions have a softening point of 575° C. to 850° C. as determined by ASTM C1351M. In another aspect, the softening point of the glass composition is about 575, 600, 625, 650, 675, 700, 725, 750, 775, 800, 825, or 850° C., where any value can be a lower- and upper-endpoint of a range (e.g., 600° C. to 700° C., 650 to 750° C., etc.).

In one aspect, the glass compositions have an internal liquidus temperature of 875° C. to 1,200° C. In another aspect, the internal liquidus temperature of the glass composition is about 875, 900, 925, 950, 975, 1,000, 1,025, 1,050, 1,075, 1,100, 1,125, 1,150, or 1,200° C., where any value can be a lower- and upper-endpoint of a range (e.g., 900° C. to 1,100° C., 1,000 to 1,150° C., etc.).

In one aspect, the glass compositions have a Young's modulus of 50 GPa to 110 GPa. In another aspect, the Young's modulus of the glass composition is about 50, 55, 60, 65, 70, 75, 80, 85, 90, 95, 100, 105, or 110 GPa, where any value can be a lower- and upper-endpoint of a range (e.g., 60 to 80 GPa, 70 to 90 GPa, etc.).

In other aspects, the color of the glass composition can be controlled. Not wishing to be bound by theory, the oxidation of multi-valence transition metal cations during glass production can discolor the final glass composition. Depending on the valence states of the transition metals, the color of the glass compositions containing Nb, Ti, and W can vary from light yellow, dark brown to deep blue. In one aspect, discoloration of the glass composition can be achieved by heating the glass composition at or near its glass transition temperature ($T_g$) in air or an atmosphere oxygen. In one aspect, the glass composition is heated 120° C. above the glass transition temperature for 10 to 1440 minutes in air or under an atmosphere of oxygen. The heat-treatment does not adversely affect the transmittance of the glass and as shown in the Examples, the transmittance and refractive index of the glass composition can be improved with the heat-treatment.

In another aspect, a component such as $CeO_2$ can be added during glass formation in order to reduce discoloration of the glass composition. In one aspect, the amount of $CeO_2$ that can be used is from 0.001 mol % to 2 mol %. As shown in the Examples, the glass transmittance and refractive index of the glass can be improved with the addition of $CeO_2$.

In one aspect, the glass compositions described herein are stable enough that they can be cast into large shapes approximately 1 cm thick and cooled to glass without devitrification.

In one aspect, the glass compositions disclosed herein exhibit chemical durability comparable to silicate compositions with similar refractive index. In another aspect, although typical phosphate glasses corrode under high moisture/high humidity conditions, the glasses disclosed herein do not deteriorate in this manner. In another aspect, the glass compositions disclosed herein have low dispersion in addition to high refractive index.

In one aspect, the glass compositions described herein can be used to produce optical articles. In one aspect, the optical article is transparent. In another aspect, the glasses provided herein may be strongly colored when formed by conventional melting in air but the color can be removed. In one aspect, the color is removed by annealing the glasses in air or oxygen at temperatures near $T_g$ for the glass compositions. In another aspect, the color is removed by the addition of an oxidation agent, e.g. $CeO_2$.

In another aspect, the glass compositions can be processed by various techniques into a powder, fiber, beads, sheets, or three-dimensional scaffolds or shapes. Glasses with desired properties and forms can be used for their applications in optical displays, augmented reality devices or virtual reality devices, non-linear photonic materials, sealing glasses, encapsulating glass for optical objects, separators in batteries, optical amplification and waveguide devices.

EXAMPLES

The following examples are put forth to provide those of ordinary skill in the art with a complete disclosure and description of how the compounds, compositions, and methods described and claimed herein are made and evaluated, and are intended to be purely exemplary and are not intended to limit the scope of the discoveries disclosed herein. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. Numerous variations and combinations of reaction conditions (e.g., component concentrations, desired solvents, solvent mixtures, temperatures, pressures, and other reaction ranges and conditions) can be used to optimize the product purity and yield obtained from the described process. Only reasonable and routine experimentation will be required to optimize such process conditions.

Example 1: Production of Glass Compositions

The glass compositions were prepared by standard melt-quench methodology from batches of metal oxide powders, metal carbonate powders and metal phosphate compound powders. $P_2O_5$ was added to the batch as phosphate compounds, e.g., lithium phosphate, sodium hexametaphosphate, potassium phosphate, calcium phosphate, barium phosphate, and/or phosphoric acid ($H_3PO_4$). The addition of phosphoric acid required calcining the batches at 350-400° C. prior to melting at 900-1,300° C. in platinum crucibles in air for 2-4 hours. Glasses, once formed, were annealed at annealing temperature or near the glass transition temperature ($T_g$) in air for about 2 hours then subsequently quenched to reduce internal stress. The glass compositions were not subsequently remelted. The glass compositions were not subsequently cleaned or subjected to post-fabrication processing. Following annealing, properties such as thermal expansion coefficient, $T_g$, refractive index, density, and others were determined.

Example 2: Sample Glass Compositions and Characterization

Several glass compositions were prepared and their properties are presented in Tables 1-9, where the amount of each component is expressed in mol %.

The following parameters in the tables below are defined as follows:

Density. The density was measured according to ASTM C693.

Refractive Index (RI) and Abbe Number ($V_d$). RI was measured with a Metricon Model 2010 Prism Coupler instrument. RI measurements were performed on the Metricon Model 2010 Prism Coupler at wavelengths of 406 nm, 473 nm, 532 nm, 633 nm, 790 nm and 981 nm using various laser sources. The Metricon 2010 prism coupler operates as a fully automated refractometer, in which the refractive index of bulk materials and/or films can be measured. Refractive indices of bulk materials, such as the provided glass samples, are measured by the Metricon 2010 Prism Coupler. Measured index of refraction results were fit to a Cauchy or Sellmeier dispersion equation and constants were determined. The refractive index for optical glasses is specified herein at a wavelength of 587.6 nm and referred to as $R_d$ and/or nD in the tables below. When refractive index was measured at a different wavelength, it is noted as n519, n532, n633, and the like, where the number indicates the wavelength in nanometers. Using fitted index dispersion values, the $V_D$ Abbe number was calculated for each glass composition.

Strain point and Annealing Point. The beam bending viscosity method measures the viscosity of inorganic glass from $10^{12}$ to $10^{14}$ poise versus temperature and from this measurement, estimates of the strain point and annealing point of the glass are obtained according to ASTM C598.

Softening Point. The parallel place viscosity method measures viscosity from $10^7$ to $10^9$ poise versus temperature and from this measurement, estimates of a "normal softening point" of the glasses was obtained. This method is similar to ASTM C1351M.

Coefficient of Thermal Expansion (CTE). A dilatometer method was used to determine a mean coefficient of linear thermal expansion (CTE) of the glasses according to ASTM E228.

Glass Transition Temperature ($T_g$) and Onset Temperature of Crystallization ($T_x$). $T_g$ and $T_x$ were measured by differential scanning calorimetry (DSC) with ramp rate of 10° C./min to 1000° C. in Argon atmosphere. Samples were pulverized with a mortar and pestle. About 30 mg was used for analysis. Samples were weighed using a microbalance and placed into a Netzsch DSC 404 F1 Pegasus instrument for analysis. The atmosphere was evacuated and backfilled in with Argon to provide an inert atmosphere.

Liquidus Temperature. The liquidus temperature was measured by the gradient furnace method. This method conforms to the ASTM C829-81 Standard Practices for Measurement of Liquidus Temperature of Glass.

Poisson's Ratio, Shear Modulus, and Young's Modulus. Young's modulus, shear modulus and Poisson's ratio were measured by Resonant Ultrasound Spectroscopy, and the instrument model is Quasar RUSpec 4000 by Magnaflux.

The following procedures were used for the Advanced Optics (AO) Test and Nano Strip 2× Test to evaluate the chemical durability of each glass. The results provided in the tables below.

Advanced optics (AO) tests were performed to evaluate the chemical durability of the glass compositions. AO tests are typically performed in evaluating optical glasses. Each glass sample (25 mm×25 mm×1 mm, surface polished) was etched in 10 wt % HCl for 10 min at 25° C. The ratio of surface area to volume used in this test is 0.33 cm$^{-1}$. After etching for 10 minutes, the samples were quenched in deionized water and rinsed in 18 MΩ water, and then dried by high-pure nitrogen gas and placed in a desiccator for overnight. Weight loss normalized to surface area (mg/cm$^2$ or mg/mm$^2$) and weight loss percentage (wt %) were calculated.

Nano Strip 2× Test. The dried samples were submerged in 600 ml of Nanostrip 2× solution (Capitol Scientific, 85% $H_2SO_4$ and <1% $H_2O_2$) for 50 min at 70° C. with a stir at 400 rpm speed. The ratio of surface area to volume used in this test is 0.08 cm$^{-1}$. After 50 minutes, the samples were quenched in deionized water and rinsed in 18 MΩ water, and then dried by high-pure nitrogen gas and placed in a desiccator for overnight. weight loss normalized to surface area (mg/cm$^2$) and weight loss percentage (wt %) was calculated.

TABLE 1

| Component | 1 | 2 | 3 | 4 | 5 | 6 | 7 | 8 |
|---|---|---|---|---|---|---|---|---|
| $Al_2O_3$ | | | | | | 4.8 | 4.8 | 4.8 | 4.8 |
| $P_2O_5$ | 30.0 | 30.0 | 30.8 | 30.3 | 30.6 | 29.9 | 30.2 | 30.1 |
| $Na_2O$ | 15.0 | 20.0 | 15.6 | 20.0 | 14.9 | 14.9 | 14.8 | 15.0 |
| $Li_2O + Na_2O + K_2O$ | 15.0 | 20.0 | 15.6 | 20.0 | 14.9 | 14.9 | 14.8 | 15.0 |
| BaO | 10.0 | 5.0 | 10.0 | 5.1 | 10.1 | 10.4 | 9.9 | 10.1 |
| ZnO | 20.0 | 10.0 | 19.4 | 9.9 | 20.0 | 5.0 | 10.0 | 15.0 |
| MgO + CaO + BaO + SrO + ZnO | 30.0 | 15.0 | 29.4 | 15.0 | 30.1 | 15.4 | 19.9 | 25.1 |
| $R_2O + RO + ZnO$ | 45.0 | 35.0 | 45.0 | 35.0 | 45.0 | 30.3 | 34.7 | 40.1 |
| $TiO_2$ | 10.0 | 10.0 | 15.0 | 10.4 | 5.2 | | | |
| $Nb_2O_5$ | 25.0 | 25.0 | 24.1 | 24.7 | 19.6 | 19.9 | 19.9 | 19.7 |
| $Nb_2O_5 + TiO_2 + WO_3$ | 25.0 | 35.0 | 24.1 | 34.7 | 19.6 | 34.9 | 30.3 | 24.9 |
| Properties | | | | | | | | |
| Density (g/cm$^3$) | 3.726 | 3.561 | 3.726 | 3.561 | 3.633 | 3.551 | 3.583 | 3.611 |
| nD | 1.811$^a$ | 1.844$^a$ | 1.811 | 1.844 | 1.761 | 1.832 | 1.807 | 1.788 |
| $V_d$ | | | 30.37 | 22.40 | 27.30 | 23.99 | 25.24 | 28.28 |
| Strain Point (° C.) | | | 526 | 559 | 502 | 568 | 544 | 520 |
| Annealing Point (° C.) | | | 562 | 593 | 538 | 604 | 581 | 556 |
| Softening Point (° C.) | | | 686 | 714 | 668 | 729 | 707 | 687 |
| CTE (<300° C., on heating) in ppm/° C. | | | 7.9 | 7.9 | 8.1 | 8.0 | 7.9 | 8.0 |
| $T_{g\ onset}$ (° C.) | 552 | 604 | 552 | 604 | 544 | 618 | 589 | 566 |
| $T_{x\ onset}$ (° C.) | 807 | 825 | 807 | 825 | 766 | 850 | 810 | 794 |
| $T_{x\ onset} - T_{g\ onset}$ (° C.) | 255 | 221 | 255 | 221 | 222 | 232 | 221 | 228 |
| Liquidus internal (° C.) | | | 1090 | 1045 | 1035 | 1085 | 1070 | 1055 |
| AO weight loss (mg/mm$^2$), | | | $4.0 \times 10^{-4}$ | $1.0 \times 10^{-3}$ | $2.5 \times 10^{-5}$ | $3.2 \times 10^{-5}$ | $2.5 \times 10^{-5}$ | $3.2 \times 10^{-5}$ |
| Nanostrip (mg/mm$^2$), | | | $1.2 \times 10^{-4}$ | $4.1 \times 10^{-5}$ | $8.4 \times 10^{-4}$ | $2.5 \times 10^{-4}$ | $3.3 \times 10^{-4}$ | $1.1 \times 10^{-3}$ |
| Poissons Ratio | | | 0.256 | 0.24 | 0.254 | 0.239 | 0.244 | 0.255 |
| Shear Modulus (GPa) | | | 33.3 | 35.8 | 32.0 | 36.3 | 34.9 | 33.4 |
| Young's Modulus (GPa) | | | 83.6 | 88.6 | 80.3 | 89.9 | 87.0 | 83.9 |

$^a$Estimate based on similar compositions.

TABLE 2

| Component | 9 | 10 | 11 | 12 | 13 | 14 | 15 | 16 | 17 | 18 |
|---|---|---|---|---|---|---|---|---|---|---|
| $P_2O_5$ | 30 | 30 | 30 | 30 | 30 | 25 | 25 | 30.5 | 35.1 | 25.3 |
| $Li_2O$ | | | 5 | 3 | | 5 | 5 | | | |

TABLE 2-continued

| Component | 9 | 10 | 11 | 12 | 13 | 14 | 15 | 16 | 17 | 18 |
|---|---|---|---|---|---|---|---|---|---|---|
| $Na_2O$ | 15 | 15 | 5 | 3 | | 5 | 5 | 33.5 | 19.9 | 24.7 |
| $K_2O$ | | | 5 | 3 | | 5 | 5 | | | |
| $Li_2O + Na_2O + K_2O$ | 15 | 15 | 15 | 9 | 0 | 15 | 15 | 33.5 | 19.9 | 24.7 |
| CaO | | | | 15 | 15 | | | | | |
| BaO | 15 | 18 | 5 | 15 | 15 | | | | | |
| SrO | 10 | 15 | 18 | 15 | 15 | 15 | 11.3 | 20 | 24.8 | |
| ZnO | | 30 | | | 15 | | | | | |
| MgO + CaO + BaO + SrO + ZnO) | 20 | 10 | | | | | | | | |
| | 30 | 30 | 30 | 36 | 45 | 30 | 30 | 11.3 | 20 | 24.8 |
| $R_2O + RO + ZnO$ | 45 | 45 | 45 | 45 | 45 | 45 | 45 | 44.8 | 39.9 | 49.5 |
| $TiO_2$ | | 10.0 | | | | | | | | |
| $Nb_2O_5$ | 20 | 25 | 25 | 25 | 25 | 15 | 25 | 24.7 | 25 | 25.2 |
| $WO_3$ | 5 | | | | | 5 | 5 | | | |
| $Nb_2O_5 + TiO_2 + WO_3$ | 25 | 25 | 25 | 25 | 25 | 30 | 30 | 24.7 | 25 | 25.2 |
| $CeO_2$ | | | 0.1 | 0.1 | 0.1 | 0.1 | 0.1 | | | |
| Properties | | | | | | | | | | |
| Density (g/cm$^3$) | 3.819 | 3.717 | 3.633 | 3.674 | 3.81 | 3.745 | 3.748 | 3.51 | 3.631 | 3.663 |
| nD | 1.788 | 1.793 | 1.807 | 1.816 | 1.832 | 1.812 | 1.851 | 1.754 | 1.757 | 1.799 |
| $V_d$ | 26.34 | 27.94 | 28.85 | 26.64 | 28.56 | 25.83 | 24.18 | 27.84 | 29.13 | 27.06 |
| Strain Point (° C.) | | | | | | | | | 533.5 | 547.2 |
| Annealing Point (° C.) | | | | | | | | | 570.2 | 578.5 |
| Softening Point (° C.) | 667.9 | 716.8 | 739.3 | 739.5 | 742.8 | 666.9 | 691.3 | 654.7 | 698.5 | 682 |
| $T_{g\ onset}$ (° C.) | 551.8 | 620.7 | 588.7 | 603 | 619.4 | 572.9 | 576.9 | 563.5 | 586.4 | 590.8 |
| $T_{x\ onset}$ (° C.) | 839.1 | 850.2 | 831 | 832.1 | 827.4 | 812.8 | 809.7 | 861.3 | 793 | 793.7 |
| $T_{x\ onset} - T_{g\ onset}$ (° C.) | 287.3 | 229.5 | 242.3 | 229.1 | 208 | 239.9 | 232.8 | 297.8 | 206.6 | 202.9 |
| Nanostrip (mg/mm$^2$) | | | $4.0 \times 10^{-4}$ | $1.3 \times 10^{-2}$ | | | | $7.0 \times 10^{-4}$ | $2.8 \times 10^{-3}$ | $1.4 \times 10^{-3}$ |
| Poissons Ratio | | | | | | | | | 0.262 | 0.27 |
| Shear Modulus (GPa) | | | | | | | | | 28.7 | 29.7 |
| Young's Modulus (GPa) | | | | | | | | | 72.6 | 75.4 |

TABLE 3

| Component | 19 | 20 | 21 | 22 | 23 | 24 | 25 | 26 | 27 | 28 | 29 | 30 |
|---|---|---|---|---|---|---|---|---|---|---|---|---|
| $P_2O_5$ | 30 | 25 | 25 | 25 | 30 | 30 | 30 | 25 | 30 | 27.5 | 27.5 | 27.5 |
| $Li_2O$ | 5 | 6 | 5 | 5 | 7 | 5 | 7 | 5 | 7 | 5 | 7 | 8 |
| $Na_2O$ | 5 | 6 | 5 | 5 | 7 | 5 | 7 | 5 | 7 | 5 | 7 | 9 |
| $K_2O$ | 5 | 5.5 | 5 | 5 | 6 | 5 | 6 | 5 | 6 | 5 | 6 | 8 |
| $Li_2O + Na_2O + K_2O$ | 15 | 17.5 | 15 | 15 | 20 | 15 | 20 | 15 | 20 | 15 | 20 | 25 |
| CaO | 10 | 12.5 | 12.5 | 12.5 | 8 | 10 | 8 | 12.5 | 8 | 11 | 9.5 | 7.5 |
| BaO | 10 | 12.5 | 12.5 | 12.5 | 9 | 10 | 9 | 12.5 | 9 | 11.5 | 10 | 7.5 |
| SrO | 10 | 10 | 10 | 10 | 8 | 0 | 0 | 10 | 8 | 10 | 8 | 7.5 |
| ZnO | | | | | | 10 | 8 | | | | | |
| MgO + CaO + BaO + SrO + ZnO | 30 | 35 | 35 | 35 | 25 | 30 | 25 | 35 | 25 | 32.5 | 27.5 | 22.5 |
| $R_2O + RO + ZnO$ | 45 | 52.5 | 50 | 50 | 45 | 45 | 45 | 50 | 45 | 47.5 | 47.5 | 47.5 |
| $TiO_2$ | | 5 | 10 | 15 | 10 | 10 | 10 | 10 | | | | |
| $Nb_2O_5$ | 25 | 22.5 | 20 | 15 | 25 | 25 | 25 | 10 | 15 | 15 | 15 | 15 |
| $Nb_2O_5 + TiO_2 + WO_3$ | 25 | 22.5 | 25 | 25 | 25 | 25 | 25 | 25 | 25 | 25 | 25 | 25 |

TABLE 3-continued

| Component | 19 | 20 | 21 | 22 | 23 | 24 | 25 | 26 | 27 | 28 | 29 | 30 |
|---|---|---|---|---|---|---|---|---|---|---|---|---|
| Properties | | | | | | | | | | | | |
| Density (g/cm$^3$) | 3.692 | 3.781 | 3.77 | 3.7 | 3.627 | 3.675 | 3.623 | 3.634 | 3.497 | 3.648 | 3.564 | 3.473 |
| nD | 1.805 | 1.803 | 1.810 | 1.791 | 1.798 | 1.816 | 1.807 | 1.773 | 1.765 | 1.784 | 1.776 | 1.765 |
| T$_{g\ onset}$ (° C.) | 591 | 577 | 587 | 582 | 568 | 564 | 548 | 581 | 554 | 587 | 559 | 543 |
| T$_{x\ onset}$ (° C.) | 856 | 783 | 791 | 806 | 783 | 833 | 837 | 781 | 816 | 795 | 771 | 762 |
| T$_{x\ onset}$ − T$_{g\ onset}$ (° C.) | 265 | 206 | 204 | 224 | 215 | 269 | 289 | 201 | 261 | 209 | 211 | 219 |

TABLE 4

| Component | 31 | 32 | 33 | 34 | 35 | 36 | 37 | 38 |
|---|---|---|---|---|---|---|---|---|
| P$_2$O$_5$ | 33.2 | 32.1 | 32.6 | 33 | 31.7 | 32.3 | 33.1 | 28.2 |
| Li$_2$O | | 10.1 | | | | | | |
| Na$_2$O | 18.3 | 14 | 21.5 | 18.1 | 13.8 | 21.4 | 21.3 | 8.7 |
| K$_2$O | | 5.1 | | | | | | |
| Li$_2$O + Na$_2$O + K$_2$O | 18.3 | 14 | 21.5 | 18.1 | 13.8 | 21.4 | 21.3 | 23.9 |
| MgO | | 7 | 14.9 | 7.1 | 14.1 | | | |
| BaO | 18.7 | 15.3 | 15.3 | 18.5 | 15.2 | 15 | 7.5 | 11.2 |
| SrO | | 10.3 | | | | | | |
| ZnO | 5.6 | 13.7 | 5.6 | | | | | |
| MgO + CaO + BaO + SrO + ZnO | 24.3 | 29 | 20.9 | 25.5 | 30.1 | 22.1 | 21.6 | 21.5 |
| R$_2$O + RO + ZnO | 42.6 | 43 | 42.4 | 43.6 | 43.9 | 43.5 | 42.9 | 45.4 |
| Nb$_2$O$_5$ | 24.2 | 24.9 | 25 | 23.4 | 24.4 | 24.2 | 24 | 26.5 |
| Nb$_2$O$_5$ + TiO$_2$ + WO$_3$ | 24.2 | 24.9 | 25 | 23.4 | 24.4 | 24.2 | 24 | 26.5 |
| Properties | | | | | | | | |
| Density (g/cm$^3$) | 3.691 | 3.705 | 3.631 | 3.661 | 3.649 | 3.6 | 3.431 | 3.718 |
| nD | 1.803 | 1.788 | 1.789 | 1.813 | 1.799 | 1.812 | 1.789 | 1.794 |
| V$_d$ | 25.26 | 26.69 | 21.45 | 26.14 | 25.45 | 23.96 | 26.49 | 28.25 |
| CTE (<300° C., on heating) in ppm/° C. | 9.6 | 8.6 | 10.1 | 9.8 | 8.8 | 10.2 | 9.6 | 11.4 |
| T$_{g\ onset}$ (° C.) | 564 | 575 | 567 | 589 | 610 | 580 | 586 | 548 |
| T$_{x\ onset}$ (° C.) | 811 | 819 | 810 | 824 | 826 | 839 | 860 | 761 |
| T$_{x\ onset}$ − T$_{g\ onset}$ (° C.) | 247 | 244 | 243 | 235 | 216 | 259 | 274 | 213 |

TABLE 5

| Component | 39 | 40 | 41 | 42 | 43 | 44 | 45 | 46 |
|---|---|---|---|---|---|---|---|---|
| P$_2$O$_5$ | 25 | 27.5 | 30 | 25.8 | 26 | 26 | 25.6 | 32.1 |
| Li$_2$O | 7 | 7 | 7 | 9.5 | 10.1 | 9.6 | 9.5 | |
| Na$_2$O | 8 | 8 | 8 | 10 | 9.8 | 9.9 | 10 | 19.6 |
| K$_2$O | 5 | 5 | 5 | 5 | 4.7 | 4.8 | 4.8 | |
| Li$_2$O + Na$_2$O + K$_2$O | 20 | 20 | 20 | 24.5 | 24.6 | 24.3 | 24.3 | 19.6 |
| CaO | 15 | 8.75 | 7.5 | 4.9 | 4.9 | 4.9 | 5 | |
| BaO | 15 | 8.75 | 7.5 | 10.3 | 10.1 | 10.2 | 10.2 | 5 |
| SrO | | | | 9.1 | 9.6 | 4.6 | 4.7 | |
| ZnO | | 10 | 10 | | | | 4.9 | 8.9 |
| MgO + CaO + BaO + SrO + ZnO | 30 | 27.5 | 25 | 24.3 | 24.6 | 19.7 | 24.8 | 13.9 |
| R$_2$O + RO + ZnO | 50 | 47.5 | 45 | 48.8 | 49.2 | 44 | 49.1 | 33.5 |
| TiO$_2$ | | | | 5.1 | | 10 | | 9.9 |
| Nb$_2$O$_5$ | 20 | 25 | 25 | 20.2 | 19.8 | 15 | 15.1 | 24.5 |
| WO$_3$ | 5 | | | | 5 | 5.1 | 10.1 | |
| Nb$_2$O$_5$ + TiO$_2$ + WO$_3$ | 25 | 25 | 25 | 25.3 | 24.8 | 30.1 | 25.2 | 34.4 |
| CeO$_2$ | | | | | | | 0.01 | 0.01 |
| Properties | | | | | | | | |
| Density (g/cm$^3$) | 3.843 | 3.688 | 3.595 | 3.662 | 3.781 | 3.681 | 3.881 | 3.512 |
| nD | 1.801 | 1.822 | 1.808 | 1.798 | 1.787 | 1.800 | 1.765 | 1.861 |
| V$_d$ | | | | 26.71 | 27.57 | 25.86 | | 22.00 |

TABLE 5-continued

| Component | 39 | 40 | 41 | 42 | 43 | 44 | 45 | 46 |
|---|---|---|---|---|---|---|---|---|
| $T_{g\ onset}$ (° C.) | 547 | 540 | 539 | 543 | 522 | 529 | 489 | 610 |
| $T_{x\ onset}$ (° C.) | 772 | 783 | 826 | 762 | 764 | 788 |  | 827 |
| $T_{x\ onset} - T_{g\ onset}$ (° C.) | 225 | 243 | 287 | 219 | 242 | 259 | a | 216 | a No crystallization peak in DSC.

TABLE 6

| Component | 47 | 48 | 49 | 50 | 51 |
|---|---|---|---|---|---|
| $P_2O_5$ | 30.0 | 30.0 | 30.0 | 30.0 | 30.0 |
| $Na_2O$ | 15.0 | 15.0 | 15.0 | 15.0 | 15.0 |
| $Li_2O + Na_2O + K_2O$ | 15.0 | 15.0 | 15.0 | 15.0 | 15.0 |
| BaO | 10 | 10 | 10 | 15 | 20 |
| ZnO | 20 | 15 | 10 | 15 | 10 |
| MgO + CaO + BaO + SrO + ZnO | 30 | 25 | 20 | 30 | 30 |
| $R_2O$ + RO + ZnO | 45 | 40 | 35 | 45 | 45 |
| $Nb_2O_5$ | 20 | 25 | 30 | 20 | 20 |
| $WO_3$ | 5 | 5 | 5 | 5 | 5 |
| $Nb_2O_5 + TiO_2 + WO_3$ | 25 | 30 | 35 | 25 | 25 |
| Properties |  |  |  |  |  |
| Density (g/cm³) | 3.818 | 3.853 | 3.885 | 3.862 | 3.959 |
| nD | 1.785 | 1.820 | 1.860 | 1.780 | 1.790 |
| $T_{gonset}$ (° C.) | 547 | 575 | 606 | 552 | 580 |
| $T_{xonset}$ (° C.) | 818 | 827 | 837 | 801 | 809 |
| $T_{xonset} - T_{gonset}$ (° C.) | 271 | 252 | 231 | 250 | 230 |

TABLE 7

| Mol % Component | 52 | 53 | 54 | 55 | 56 | 57 | 58 | 59 | 60 | 61 | 62 | 63 |
|---|---|---|---|---|---|---|---|---|---|---|---|---|
| $P_2O_5$ | 30 | 30 | 30 | 30 | 30 | 30 | 30 | 30 | 30 | 25 | 25 | 30 |
| $Li_2O$ | 5 | 5 |  | 5 | 7 | 7 | 7 | 7 | 7 | 8.75 | 7 | 7 |
| $Na_2O$ | 10 | 5 | 20 | 10 | 7 | 7 | 7 | 8 | 8 | 10 | 8 | 8 |
| $K_2O$ | 5 | 5 |  | 5 | 6 | 6 | 6 | 5 | 5 | 6.25 | 5 | 5 |
| $Li_2O + Na_2O + K_2O$ | 20 | 15 | 20 | 20 | 20 | 20 | 20 | 20 | 20 | 25 | 20 | 20 |
| CaO |  | 10 |  |  | 7.36 | 6.08 | 4.8 | 8 | 8 | 8 | 10 | 10 |
| BaO | 10 | 15 | 5 | 5 | 8.28 | 6.84 | 5.4 | 9 | 9 | 9 | 9.99 | 10 |
| SrO | 5 |  |  |  |  |  |  |  |  | 8 | 10 |  |
| ZnO | 5 |  | 10 | 10 | 7.36 | 6.08 | 4.8 | 8 | 8 |  |  | 10 |
| MgO + CaO + BaO + SrO + ZnO | 20 | 25 | 15 | 15 | 23 | 19 | 15 | 25 | 25 | 25 | 29.99 | 30 |
| $R_2O$ + RO + ZnO | 40 | 40 | 35 | 35 | 43 | 39 | 35 | 45 | 45 | 50 | 49.99 | 50 |
| $TiO_2$ | 5 | 10 | 10 | 20 |  |  |  | 5 | 10 | 15 | 15 |  |
| $Nb_2O_5$ | 15 | 15 | 25 | 15 | 25 | 25 | 25 | 20 | 15 | 10 | 10 | 20 |
| $WO_3$ | 10 | 5 |  |  | 2 | 6 | 10 |  |  |  |  |  |
| $Nb_2O_5 + TiO_2 + WO_3$ | 30 | 30 | 35 | 35 | 27 | 31 | 35 | 25 | 25 | 25 | 25 | 20 |
| $CeO_2$ | 0.01 | 0.01 | 0.001 | 0.001 |  |  |  |  |  |  | 0.01 |  |
| Properties |  |  |  |  |  |  |  |  |  |  |  |  |
| Density (g/cm³) | 3.752 | 3.671 | 3.534 | 3.399 | 3.597 | 3.673 | 3.755 | 3.55 | 3.48 | 3.477 | 3.56 | 3.577 |
| nD | 1.765 | 1.78 | 1.82 | 1.805 | 1.795 | 1.805 | 1.82 | 1.789 | 1.771 | 1.756 | 1.766 | 1.764 |
| $T_{g\ onset}$ (° C.) | 524 | 574 | 610 | 569 | 542 | 541 | 547 | 535 | 526 | 525 | 548 | 517 |
| $T_{x\ onset}$ (° C.) | 800 | 778 | 824 | 789 | 806 | 810 | 786 | 776 | 803 |  |  | 808 |
| $T_{x\ onset} - T_{g\ onset}$ (° C.) | 276 | 204 | 214 | 220 | 264 | 268 | 239 | 241 | 277 | a | a | 291 | a No crystallization peak in DSC.

TABLE 8

| Comp. | 64 | 65 | 66 | 67 | 68 | 69 | 70 | 71 | 72 | 73 | 74 | 75 | 76 | 77 |
|---|---|---|---|---|---|---|---|---|---|---|---|---|---|---|
| $P_2O_5$ | 25.7 | 25.6 | 25.8 | 25.4 | 25.7 | 30 | 30 | 30 | 30 | 30 | 30 | 30 | 30.0 | 29.3 |
| $Li_2O$ | 10 | 9.9 | 10 | 10 | 10 | 7 | 7 | 7 | 7 | 7 | 7 | 7 | 6.9 | 6.8 |
| $Na_2O$ | 10.3 | 10.4 | 10.3 | 10.4 | 10.6 | 8 | 8 | 8 | 8 | 8 | 8 | 8 | 7.0 | 7.1 |
| $K_2O$ | 5.1 | 5 | 5 | 5.1 | 4.7 | 5 | 5 | 5 | 5 | 5 | 5 | 5 | 5.9 | 6.0 |
| $R_2O\ Li_2O + Na_2O + K_2O$ | 25.4 | 25.3 | 25.3 | 25.5 | 25.3 | 20 | 20 | 20 | 20 | 20 | 20 | 20 | 19.8 | 20.0 |
| MgO |  |  |  |  |  |  |  |  |  |  |  |  |  | 0.2 |

TABLE 8-continued

| Comp. | 64 | 65 | 66 | 67 | 68 | 69 | 70 | 71 | 72 | 73 | 74 | 75 | 76 | 77 |
|---|---|---|---|---|---|---|---|---|---|---|---|---|---|---|
| CaO | 4.9 | 4.9 | 4.9 | 4.8 | 4.9 | 12 | 12 | 10.5 | 9 | 10 | 12 | 12 | 7.8 | 7.9 |
| BaO | 10.1 | 10.2 | 10.1 | 10.2 | 10.1 | 10 | 10 | 8.5 | 7 | 10 | 10 | 10 | 9.2 | 9.2 |
| SrO | 4.6 | 5 | 4.7 | 4.8 | 4.9 | | | | | | | | | |
| ZnO | 4.5 | 4.5 | 4.5 | 7 | 6.9 | 5 | 5 | 8 | 11 | 5 | 5 | 5 | 8.1 | 8.5 |
| MgO + CaO + BaO + SrO + ZnO | 24.1 | 24.6 | 24.2 | 26.8 | 26.8 | 27 | 27 | 27 | 27 | 25 | 27 | 27 | 25.3 | 25.6 |
| $R_2O$ + RO + ZnO | 49.5 | 49.9 | 49.5 | 52.3 | 52.1 | 47 | 47 | 47 | 47 | 45 | 47 | 47 | 45.1 | 45.6 |
| $La_2O_3$ | | | | | | | | | | | 1 | 2 | | |
| $Nb_2O_5$ | 14.6 | 16.9 | 19.7 | 14.8 | 17.1 | 20.5 | 18 | 18 | 18 | 23 | 22 | 21 | 24.9 | 25.0 |
| $WO_3$ | 10.1 | 7.6 | 5.1 | 7.5 | 5.1 | 2.5 | 5 | 5 | 5 | | | | | |
| $Nb_2O_5$ + $TiO_2$ + $WO_3$ | 24.7 | 24.5 | 24.8 | 22.3 | 22.2 | 23 | 23 | 23 | 23 | 23 | 22 | 21 | 24.9 | 25.0 |
| SnO | | | | | | | | | | 2 | | | | |
| $La_2O_3$ + $Ta_2O_5$ + $Y_2O_3$ + $HfO_2$ | | | | | | | | | | | 1 | 2 | | |
| Properties | | | | | | | | | | | | | | |
| Density (g/cm$^3$) | 3.855 | 3.824 | 3.791 | 3.809 | 3.774 | 3.620 | 3.645 | 3.644 | 3.637 | 3.622 | 3.622 | 3.652 | 3.609 | 3.629 |
| nD | 1.767 | 1.777 | 1.793 | 1.760 | 1.771 | 1.773 | 1.761 | 1.760 | 1.764 | 1.789 | 1.783 | 1.779 | 1.804 | 1.808 |
| $V_d$ | 29.39 | 29.01 | 27.67 | 29.65 | 29.00 | | | | | | | | | |
| Annealing Point (° C.) | | | | | | 517 | 506 | 496 | 494 | | 532 | | | |
| $T_{g\ onset}$ (° C.) | 489 | 499 | 511 | 484 | 495 | 528 | 517 | 508 | 503 | 551 | 543 | 542 | 553 | 551 |
| $T_{x\ onset}$ (° C.) | | 747 | 735 | | 719 | 850 | | | | | 777 | | 840 | 822 |
| $T_{x\ onset}$ − $T_{g\ onset}$ (° C.) | a | 248 | 224 | a | 225 | 322 | a | a | a | a | 234 | a | 287 | 271 |
| Nanostrip (mg/mm$^2$) | | | | | | 9.9 × 10$^{-4}$ | 9.9 × 10$^{-4}$ | 1.8 × 10$^{-3}$ | 7.5 × 10$^{-4}$ | | | | | | a No crystallization peak in DSC.

TABLE 9

| Mol % Component | 78 | 79 | 80 | 81 | 82 |
|---|---|---|---|---|---|
| $Al_2O_3$ | 0.2 | 0.1 | | | 0.1 |
| $P_2O_5$ | 30.9 | 31.2 | 30.8 | 30.6 | 30.6 |
| $Na_2O$ | 33.1 | 32.2 | 19.8 | 20.4 | 19.7 |
| $Li_2O$ + $Na_2O$ + $K_2O$ | 33.1 | 32.2 | 19.8 | 20.4 | 19.7 |
| BaO | 11.5 | 11.6 | 5.0 | 5.0 | 5.0 |
| ZnO | | | 9.9 | 9.8 | 9.9 |
| MgO + CaO + BaO + SrO + ZnO | 11.5 | 11.6 | 15.0 | 14.8 | 14.9 |
| $R_2O$ + RO + ZnO | 44.6 | 43.7 | 34.8 | 35.2 | 34.6 |
| $TiO_2$ | | | 9.9 | 9.9 | 10.0 |
| $Nb_2O_5$ | 24.3 | 24.9 | 24.5 | 24.3 | 24.6 |
| $Nb_2O_5$ + $TiO_2$ + $WO_3$ | 24.3 | 24.9 | 34.4 | 34.2 | 34.6 |
| $CeO_2$ | | | | | 0.1 |
| Properties | | | | | |
| Density (g/cm$^3$) | 3.515 | 3.509 | 3.426 | 3.385 | 3.563 |
| nD | 1.754 | 1.753 | 1.844 | 1.846 | 1.842 |
| $T_{gonset}$ (° C.) | 557 | 566 | 612 | 614 | 608 |
| $T_{xonset}$ (° C.) | | | 846 | 845 | 845 |
| $T_{xonset}$ − $T_{gonset}$ (° C.) | a | a | 234 | 231 | 237 | a No crystallization peak in DSC.

TABLE 10

| Mol % Component | 83 | 84 | 85 | 86 | 87 | 88 | 89 | 90 | 91 | 92 |
|---|---|---|---|---|---|---|---|---|---|---|
| $B_2O_3$ | | 2.5 | 5.0 | 2.8 | 2.8 | 2.8 | 2.5 | 2.5 | | 5.0 |
| $P_2O_5$ | 30.0 | 27.5 | 25.0 | 25.3 | 25.1 | 25.0 | 30.0 | 30.0 | 30.0 | 30.0 |
| $Li_2O$ | 7.0 | 7.0 | 7.0 | 10.0 | 8.9 | 9.8 | 10.2 | 7.9 | 8.4 | 7.3 |
| $Na_2O$ | 8.0 | 8.0 | 8.0 | 9.7 | 9.4 | 9.7 | 10.2 | 7.9 | 8.4 | 7.3 |
| $K_2O$ | 5.0 | 5.0 | 5.0 | 4.2 | 3.8 | 4.2 | 4.5 | 3.5 | 3.8 | 3.3 |
| $Li_2O$ + $Na_2O$ + $K_2O$ | 20.0 | 20.0 | 20.0 | 23.9 | 22.1 | 23.7 | 25.0 | 19.3 | 20.6 | 17.9 |
| CaO | 12.0 | 12.0 | 12.0 | 4.9 | 4.9 | 4.9 | 2.8 | 4.4 | 4.7 | 4.1 |
| BaO | 10.0 | 10.0 | 10.0 | 9.1 | 9.4 | 9.2 | 5.0 | 7.9 | 8.4 | 7.3 |
| SrO | | | | 4.9 | 3.8 | 5.1 | 2.2 | 3.5 | 3.8 | 3.3 |
| ZnO | 5.0 | 5.0 | 5.0 | 7.0 | 4.6 | 4.6 | 5.0 | 5.0 | 5.0 | 5.0 |

TABLE 10-continued

| Mol % Component | 83 | 84 | 85 | 86 | 87 | 88 | 89 | 90 | 91 | 92 |
|---|---|---|---|---|---|---|---|---|---|---|
| MgO + CaO + BaO + SrO + ZnO | 27.0 | 27.0 | 27.0 | 25.9 | 22.7 | 23.8 | 15.0 | 20.8 | 21.9 | 19.6 |
| $R_2O + RO + ZnO$ | 47.0 | 47.0 | 47.0 | 49.8 | 44.8 | 47.5 | 40.0 | 40.0 | 42.5 | 37.5 |
| $Nb_2O_5$ | 23.0 | 23.0 | 23.0 | 14.6 | 17.2 | 17.0 | 17.5 | 17.5 | 17.5 | 17.5 |
| $WO_3$ | | | | 7.6 | 9.9 | 7.5 | 10.0 | 10.0 | 10.0 | 10.0 |
| $Nb_2O_5 + TiO_2 + WO_3$ | 23.0 | 23.0 | 23.0 | 22.2 | 27.1 | 24.5 | 27.5 | 27.5 | 27.5 | 27.5 |
| Properties | | | | | | | | | | |
| Density (g/cm³) | 3.590 | 3.608 | 3.642 | 3.788 | 3.875 | 3.801 | 3.658 | 3.758 | 3.783 | 3.729 |
| nD | 1.787 | 1.797 | 1.807 | 1.761 | 1.796 | 1.782 | 1.760 | 1.770 | 1.772 | 1.772 |
| $V_d$ | | | | 30.31 | 27.26 | 28.73 | | | | |
| Strain Point (° C.) | | | | | | | | | 464 | |
| Annealing Point (° C.) | | | | | | | | | 498 | |
| Softening point (° C.) | | | | | 613 | | | | | |
| $T_{g\,onset}$ (C) | 542 | 529 | 524 | 483 | 503 | 497 | 492 | 514 | 512 | 518 |
| $T_{x\,onset}$ (C) | 807 | 790 | 767 | | | | | 815 | | 786 |
| $T_{x\,onset} - T_{g\,onset}$ (° C.) | 265 | 262 | 243 | a | a | a | a | 302 | a | 268 | a No crystallization peak in DSC.

TABLE 11

| Mol % Component | 93 | 94 | 95 | 96 | 97 | 98 | 99 | 100 | 101 | 102 |
|---|---|---|---|---|---|---|---|---|---|---|
| $B_2O_3$ | 7.5 | 2.5 | 2.5 | | | | | 2.8 | 2.9 | 2.8 |
| $P_2O_5$ | 30.0 | 30.0 | 30.0 | 25.0 | 25.0 | 24.7 | 24.6 | 25.1 | 24.9 | 25.1 |
| $Li_2O$ | 6.8 | 8.4 | 7.3 | 10.0 | 10.0 | 9.5 | 9.7 | 8.3 | 8.8 | 8.5 |
| $Na_2O$ | 6.8 | 8.4 | 7.3 | 10.0 | 10.0 | 9.9 | 9.5 | 8.7 | 8.9 | 8.7 |
| $K_2O$ | 3.0 | 3.8 | 3.3 | 5.0 | 5.0 | 4.9 | 4.8 | 3.8 | 4.0 | 3.7 |
| $Li_2O + Na_2O + K_2O$ | 16.5 | 20.6 | 17.9 | 25.0 | 25.0 | 24.3 | 24.0 | 20.7 | 21.7 | 21.0 |
| CaO | 3.8 | 4.7 | 4.1 | 5.0 | 5.0 | 5.1 | 5.1 | 5.1 | 5.0 | 5.1 |
| BaO | 6.8 | 8.4 | 7.3 | 10.0 | 10.0 | 9.9 | 10.1 | 9.0 | 9.0 | 9.1 |
| SrO | 3.0 | 3.8 | 3.3 | 5.0 | 5.0 | 4.9 | 5.0 | 4.0 | 3.9 | 3.9 |
| ZnO | 5.0 | 5.0 | 5.0 | 5.0 | 5.0 | 5.4 | 5.4 | 5.0 | 5.0 | 5.1 |
| MgO + CaO + BaO + SrO + ZnO | 18.5 | 21.9 | 19.6 | 25.0 | 25.0 | 25.3 | 25.6 | 23.1 | 22.9 | 23.2 |
| $R_2O + RO + ZnO$ | 35.0 | 42.5 | 37.5 | 50.0 | 50.0 | 49.6 | 49.6 | 43.8 | 44.6 | 44.1 |
| $TiO_2$ | | | | 4.7 | 5.5 | | | | | |
| $Nb_2O_5$ | 17.5 | 17.5 | 17.5 | 11.9 | 6.9 | 15.4 | 15.4 | 18.0 | 17.4 | 17.6 |
| $WO_3$ | 10.0 | 7.5 | 12.5 | 8.5 | 12.6 | 10.3 | 10.3 | 10.2 | 10.0 | 10.1 |
| $Nb_2O_5 + TiO_2 + WO_3$ | 27.5 | 25.0 | 30.0 | 25.0 | 25.0 | 25.7 | 25.7 | 28.2 | 27.4 | 27.8 |
| $CeO_2$ | | | | | | 0.02 | 0.2 | 0.02 | 0.2 | 0.2 |
| Properties | | | | | | | | | | |
| Density (g/cm³) | 3.702 | 3.677 | 3.814 | 3.809 | 3.895 | 3.878 | 3.896 | 3.860 | 3.865 | 3.656 |
| nD | 1.770 | 1.760 | 1.785 | 1.775 | 1.755 | 1.772 | 1.775 | 1.795 | 1.792 | 1.760 |
| $V_d$ | | | | | | | | | | |
| Strain Point (° C.) | | 462 | 479 | | | | | | | |
| Annealing Point (° C.) | | 497 | 513 | | | | | | | |
| $T_{g\,onset}$ (° C.) | 519 | 507 | 521 | 500 | 472 | 493 | 493 | 504 | 505 | 506 |
| $T_{x\,onset}$ (° C.) | 767 | | 782 | 729 | | | | | | |
| $T_{x\,onset} - T_{g\,onset}$ (° C.) | 249 | a | 262 | 228 | a | a | a | a | a | a | a No crystallization peak in DSC.

TABLE 12

| Mol % Component | 103 | 104 | 105 | 106 | 107 | 108 | 109 | 110 | 111 | 112 |
|---|---|---|---|---|---|---|---|---|---|---|
| $B_2O_3$ | 2.8 | | | | | | | 2.8 | 2.8 | 2.8 |
| $P_2O_5$ | 30.1 | 25.2 | 25.1 | 25.1 | 30.3 | 30.4 | 30.2 | 25.4 | 25.5 | 25.4 |
| $Li_2O$ | 8.4 | 9.8 | 9.9 | 10.0 | 6.9 | 6.8 | 6.9 | 9.1 | 9.1 | 9.0 |
| $Na_2O$ | 8.5 | 10.2 | 10.2 | 10.2 | 7.6 | 7.5 | 7.6 | 9.0 | 9.0 | 9.0 |
| $K_2O$ | 3.7 | 4.8 | 4.9 | 4.9 | 5.9 | 5.9 | 5.9 | 3.9 | 3.9 | 3.9 |
| $Li_2O + Na_2O + K_2O$ | 20.6 | 24.8 | 25.0 | 25.1 | 20.4 | 20.2 | 20.4 | 22.0 | 22.0 | 22.0 |
| CaO | 4.8 | 5.1 | 5.1 | 5.0 | 7.7 | 7.7 | 7.7 | 4.8 | 4.8 | 4.8 |
| BaO | 8.4 | 10.1 | 10.1 | 10.1 | 9.1 | 9.1 | 9.0 | 9.1 | 9.1 | 9.1 |

TABLE 12-continued

| Mol % Component | 103 | 104 | 105 | 106 | 107 | 108 | 109 | 110 | 111 | 112 |
|---|---|---|---|---|---|---|---|---|---|---|
| SrO | 3.5 | 4.9 | 4.9 | 4.9 | | | | 3.8 | 3.9 | 3.9 |
| ZnO | 5.0 | 4.6 | 4.6 | 4.6 | 7.3 | 7.3 | 7.2 | 5.1 | 4.9 | 4.9 |
| MgO + CaO + BaO + SrO + ZnO | 21.6 | 24.7 | 24.7 | 24.6 | 24.1 | 24.1 | 23.9 | 22.9 | 22.8 | 22.7 |
| $R_2O$ + RO + ZnO | 42.2 | 49.5 | 49.7 | 49.7 | 44.5 | 44.3 | 44.3 | 44.9 | 44.8 | 44.7 |
| $Nb_2O_5$ | 17.4 | 14.6 | 14.6 | 14.5 | 24.3 | 24.5 | 24.7 | 17.3 | 17.3 | 17.4 |
| $WO_3$ | 7.5 | 10.3 | 10.2 | 10.2 | | | | 9.6 | 9.6 | 9.7 |
| $Nb_2O_5$ + $TiO_2$ + $WO_3$ | 24.9 | 24.9 | 24.8 | 24.7 | 24.3 | 24.5 | 24.7 | 27.0 | 26.9 | 27.1 |
| $CeO_2$ | 0.02 | | | | | | | | | |
| $Ta_2O_5$ | | 0.4 | 0.4 | 0.4 | 0.7 | 0.7 | 0.7 | | | |
| Properties |||||||||||
| Density (g/cm³) | 3.675 | 3.842 | 3.816 | 3.863 | 3.594 | 3.590 | 3.597 | | | |
| nD | 1.760 | | | 1.768 | | | 1.804 | 1.790 | 1.790 | 1.794 |
| Strain Point (° C.) | | | | 446 | | 501 | | | | |
| Annealing Point (° C.) | | | | 478 | | 537 | | | | |
| Softening point (° C.) | | | | 591 | | 671 | | | | |
| CTE (<300° C., on heating) ppm/(° C.) | | | | 12.2 | | 9.2 | | | | 10.8 |
| $T_{g\ onset}$ (° C.) | 505 | | | | | | | | | |
| $T_{x\ onset}$ (° C.) | | | | | | | | | | |
| $T_{x\ onset}$ − $T_{g\ onset}$ (° C.) | a | | | | | | | | | |
| Liquidus Internal (° C.) | | 900 | | | | 1015 | | | | | a No crystallization peak in DSC.

TABLE 13

| Mol % Component | 113 | 114 | 115 | 116 |
|---|---|---|---|---|
| $B_2O_3$ | 2.6 | | | |
| $P_2O_5$ | 25.7 | 30.2 | 31.2 | 30 |
| $Li_2O$ | 16.5 | | | |
| $Na_2O$ | 16.5 | 20.9 | 13.9 | 24.7 |
| $K_2O$ | 7.0 | | | |
| $R_2O$ ($Li_2O$ + $Na_2O$ + $K_2O$) | 40.0 | 20.9 | 13.9 | 24.7 |
| CaO | | | | |
| BaO | | 4.7 | 9.6 | |
| SrO | | | | |
| ZnO | 3.5 | 9.6 | 19.5 | |
| RO | | 4.7 | 9.6 | |
| RO + ZnO(MgO + CaO + BaO + SrO + ZnO) | 3.5 | 14.3 | 29.1 | |
| $R_2O$ + RO + ZnO | 43.5 | 35.2 | 43.0 | 24.7 |
| $TiO_2$ | | 9.6 | | 10 |
| $Nb_2O_5$ | 17.6 | 24.1 | 25.1 | 35.3 |
| $WO_3$ | 10.0 | | | |
| $Nb_2O_5$ + $TiO_2$ + $WO_3$ | 27.6 | 33.7 | 25.1 | 45.3 |
| $CeO_2$ | | 0.8 | 0.8 | |
| $Ta_2O_5$ | 0.6 | | | |
| Properties |||||
| Density (g/ccm³) | 3.509 | | | 3.523 |
| nD | 1.755 | 1.848 | 1.818 | 1.904 |
| $V_d$ | | 21.88 | 25.30 | 20.86 |
| Strain Point | | 558 | 531 | 622.9 |
| Annealing Point | | 594 | 566 | 655.8 |
| Softening point | | 720 | | 763 |
| $T_{gonset}$ (° C.) | 454 | | | 669 |
| $T_{xonset}$ (° C.) (ExPC 1 onset ° C.) | | | | 841 |
| $T_{xonset}$ − $T_{gonset}$ | a | | | 172 | a No crystallization peak in DSC.

Example 3: Glass Compositions with Refractive Index Greater than 1.8

Glass compositions as disclosed herein having refractive index higher than 1.8 are presented in Tables 14 through 21 along with selected properties. Abbreviations representing properties not already listed in Example 2 are reviewed below:

TABLE 14

| Component | 117 | 118 | 119 | 120 | 121 |
|---|---|---|---|---|---|
| $Li_2O$ | 5 | 5 | 5 | 5 | 5 |
| $Na_2O$ | 5 | 5 | 5 | 5 | 5 |
| $K_2O$ | 5 | 5 | 5 | 5 | 5 |
| CaO | 12.5 | 11.25 | 10 | 9 | 7 |
| BaO | 12.5 | 11.25 | 10 | 9 | 7 |
| ZnO | 10 | 10 | 10 | 9.5 | 8.5 |
| $TiO_2$ | | | | 2.5 | |
| $Nb_2O_5$ | 25 | 27.5 | 30 | 30 | 30 |
| $WO_3$ | | | | | 7.5 |
| $P_2O_5$ | 25 | 25 | 25 | 25 | 25 |
| Properties ||||||
| Density (g/cm³) | | 3.86 | 3.85 | 3.835 | 3.977 |
| n532 | 1.869 | 1.879 | 1.892 | 1.906 | 1.921 |
| nD | 1.859 | 1.868 | 1.881 | 1.894 | 1.908 |
| n633 | 1.850 | 1.86 | 1.872 | 1.885 | 1.899 |

TABLE 15

| Component | 122 | 123 | 124 | 125 | 126 | 127 | 128 | 129 | 130 |
|---|---|---|---|---|---|---|---|---|---|
| $Li_2O$ | 5 | 5 | 5 | 5 | 5 | 5 | 5 | 5 | 5 |
| $Na_2O$ | 5 | 5 | 5 | 5 | 5 | 5 | 5 | 5 | 5 |
| $K_2O$ | 5 | 5 | 5 | 5 | 5 | 5 | 5 | 5 | 5 |
| CaO | 9 | 9 | 9 | 9 | 9 | 9 | 8 | 8 | 12.5 |
| BaO | 9.5 | 9.5 | 9.5 | 9.5 | 9.5 | 9.5 | 9 | 9 | 12.5 |
| ZnO | 9 | 9 | 9 | 9 | 9 | 9 | 8 | 8 | |

TABLE 15-continued

| Component | 122 | 123 | 124 | 125 | 126 | 127 | 128 | 129 | 130 |
|---|---|---|---|---|---|---|---|---|---|
| $TiO_2$ | 5 | 7. | 10 | | | | 7.5 | | 7.5 |
| $Nb_2O_5$ | 27.5 | 25 | 22.5 | 27.5 | 25 | 22.5 | 25 | 25 | 25 |
| $WO_3$ | | | | 5 | 7.5 | 10 | | 7.5 | |
| $P_2O_5$ | 25 | 25 | 25 | 25 | 25 | 25 | 27.5 | 27.5 | 27.5 |
| Properties | | | | | | | | | |
| Density (g/cm³) | 3.825 | 3.794 | 3.76 | 3.946 | 3.979 | 3.993 | 3.719 | 3.902 | 3.721 |
| n532 | 1.903 | 1.894 | 1.886 | 1.896 | 1.884 | 1.871 | 1.879 | 1.867 | 1.871 |
| nD | 1.89 | 1.882 | 1.874 | 1.884 | 1.872 | 1.86 | 1.868 | 1.856 | 1.859 |
| n633 | 1.881 | 1.873 | 1.864 | 1.875 | 1.863 | 1.851 | 1.859 | 1.847 | 1.851 |
| $T_g$ | 590 | 586 | 582 | 578 | 567 | 559 | 587 | 570 | 609 |
| $T_x$ | 720 | 728 | 741 | 707 | 720 | 743 | 797 | 815 | 806 |
| $T_x - T_g$ | 130 | 142 | 159 | 129 | 153 | 184 | 210 | 245 | 197 |
| CTE($\alpha$)($10^7$/° C.) | | | 83.5 | | | | | | |
| Nanostrip (mg/cm²) | 0.004 | | 0.015 | 0.006 | | 0.012 | | | |

TABLE 16

| Component | 131 | 132 | 133 | 134 | 135 | 136 | 137 | 138 |
|---|---|---|---|---|---|---|---|---|
| $Li_2O$ | 5 | 5 | 5 | 5 | 5 | 5 | 5 | 5 |
| $Na_2O$ | 5 | 5 | 5 | 5 | 5 | 5 | 5 | 5 |
| $K_2O$ | 5 | 5 | 5 | 5 | 5 | 5 | 5 | 5 |
| CaO | 9 | 9 | 9 | 10 | 8 | 7.5 | 8 | 7.5 |
| BaO | 9.5 | 9.5 | 9.5 | 11 | 8 | 7.5 | 8 | 7.5 |
| ZnO | 9 | 9 | 9 | 11 | 9 | 7.5 | 9 | 7.5 |
| $TiO_2$ | | 2.5 | | 2.5 | 10 | 12.5 | 12.5 | 15 |
| $Nb_2O_5$ | 32.5 | 30 | 30.5 | 25 | 25 | 25 | 22.5 | 22.5 |
| $WO_3$ | | | 2 | 2.5 | | | | |
| $P_2O_5$ | 25 | 25 | 25 | 23 | 25 | 25 | 25 | 25 |
| Properties | | | | | | | | |
| Density (g/cm²) | 3.881 | 3.851 | 3.908 | 3.946 | 3.767 | 3.748 | 3.736 | 3.711 |
| n519 | 1.922 | 1.914 | 1.913 | 1.892 | 1.911 | 1.922 | 1.902 | 1.913 |
| nD | 1.906 | 1.898 | 1.897 | 1.877 | 1.895 | 1.906 | 1.886 | 1.897 |
| n633 | 1.896 | 1.889 | 1.888 | 1.868 | 1.885 | 1.895 | 1.876 | 1.887 |
| $T_g$ | 596 | 586 | | | 581 | 589 | 577 | 584 |
| $T_x$ | 700 | 703 | | | 717 | 724 | 726 | 735 |
| $T_x - T_g$ | 104 | 117 | | | 136 | 135 | 149 | 151 |
| a ($10^{-7}$/° C.) | | 80.3 | | | 83.2 | 78.4 | 80 | 83 |
| Nanostrip (mg/cm²) | 0.004 | | | 0.023 | 0.03 | 0.028 | 0.006 | |

TABLE 17

| Component | 139 | 140 | 141 | 142 | 143 | 144 | 145 | 146 |
|---|---|---|---|---|---|---|---|---|
| $Li_2O$ | 5 | 5 | 5 | 5 | 5 | 5 | 5 | 5 |
| $Na_2O$ | 5 | 5 | 5 | 5 | 5 | 5 | 5 | 5 |
| $K_2O$ | 5 | 5 | 5 | 5 | 5 | 5 | 5 | 5 |
| MgO | | | | 5.5 | 4 | 4 | | |
| CaO | 8 | 7.5 | 5 | 4 | 4 | 6.5 | 6 | 5 |
| BaO | 8 | 7.5 | 8 | 8 | 8 | 6.5 | 5.5 | 5 |
| ZnO | 9 | 7.5 | 9 | 9 | 9 | 7 | 6 | 6 |
| $TiO_2$ | | | 5 | 10 | 12.5 | 20 | 25 | 29 |
| $Nb_2O_5$ | 25 | 25 | 27.5 | 25 | 22.5 | 20 | 17.5 | 15 |
| $WO_5$ | 10 | 12.5 | | | | | | |
| $P_2O_5$ | 25 | 25 | 25 | 25 | 25 | 25 | 25 | 25 |
| Properties | | | | | | | | |
| Density (g/cm³) | 4.018 | 4.06 | | 3.777 | 3.742 | 3.646 | 3.583 | 3.536 |
| n519 | 1.895 | 1.904 | | 1.912 | 1.903 | | | |
| n532 | | | | | | 1.909 | 1.913 | 1.912 |
| nD | 1.88 | 1.888 | | 1.897 | 1.888 | 1.896 | 1.899 | 1.899 |
| n633 | 1.871 | 1.879 | | 1.887 | 1.878 | 1.887 | 1.889 | 1.889 |
| $T_g$ | | | | 579 | 574 | 585 | 590 | 593 |
| $T_x$ | | | | 689 | 699 | 772 | 781 | 815 |
| $T_x - T_g$ | | | | 110 | 125 | 187 | 191 | 221 |
| a ($10^{-7}$/° C.) | | | | | 81.4 | 81.2 | 83.8 | 80.3 |
| Nanostrip (mg/cm²) | | | | | | | 0.012 | 0.037 |

TABLE 18

| Component | 147 | 148 | 149 | 150 | 151 | 152 | 153 | 154 |
|---|---|---|---|---|---|---|---|---|
| $Li_2O$ | 5 | 5 | 5 | 5 | 5 | 5 | 5 | 5 |
| $Na_2O$ | 5 | 5 | 5 | 5 | 5 | 5 | 5 | 5 |
| $K_2O$ | 5 | 5 | 5 | 5 | 5 | 5 | 5 | 5 |
| CaO | 4.14 | 8 | 7.5 | 7 | 6.5 | 6 | 5.5 | 7.5 |
| BaO | 4 | 7.5 | 7 | 7 | 6 | 6 | 5.5 | 7 |
| ZnO | 5 | 9 | 7.5 | 7.5 | 7 | 7 | 6 | 7.5 |
| $TiO_2$ | 11.25 | 10 | 15 | 15 | 20 | 20 | 20 | 10 |
| $SnO_2$ |  | 0.5 | 0.5 | 1 | 0.5 | 1 |  |  |
| $Nb_2O_5$ | 35.75 | 25 | 22.5 | 22.5 | 20 | 20 | 21 | 26 |
| $Al_2O_3$ |  |  |  |  |  |  | 2 | 2 |
| $P_2O_5$ | 24.86 | 25 | 25 | 25 | 25 | 25 | 25 | 25 |
| Properties | | | | | | | | |
| Density (g/cm³) | 3.785 | 3.769 | 3.714 | 3.722 | 3.654 | 3.663 | 3.614 | 3.731 |
| n519 |  |  |  |  |  |  | 1.915 | 1.911 |
| n532 | 1.986 | 1.907 | 1.909 | 1.909 | 1.912 | 1.913 |  |  |
| nD | 1.971 | 1.893 | 1.896 | 1.896 | 1.898 | 1.899 | 1.899 | 1.895 |
| n633 | 1.959 | 1.885 | 1.887 | 1.887 | 1.889 | 1.89 | 1.888 | 1.885 |
| $T_g$ |  |  |  |  |  |  | 585 | 582 |
| $T_x$ |  |  |  |  |  |  | 699 | 693 |
| $T_x - T_g$ |  |  |  |  |  |  | 114 | 111 |
| Nanostrip (mg/cm²) |  |  |  |  |  |  | 0.007 | 0.004 |

TABLE 19

| Component | 155 | 156 | 157 | 158 | 159 | 160 | 161 | 162 | 163 |
|---|---|---|---|---|---|---|---|---|---|
| $Li_2O$ | 7 |  |  | 5 | 5 | 5 | 5 | 5 | 5 |
| $Na_2O$ | 8 | 8 | 15 | 5 | 5 | 5 | 5 | 5 | 5 |
| $K_2O$ |  | 7 |  | 5 | 5 | 5 | 5 | 5 | 5 |
| CaO | 8 | 8 | 8 | 24 |  |  | 11 | 11 |  |
| SrO |  |  |  |  |  |  | 13 | 18 | 13 |
| BaO | 8 | 8 | 8 |  | 24 | 29 |  |  | 11 |
| ZnO | 8 | 8 | 8 |  |  |  |  |  |  |
| $TiO_2$ | 10 | 10 | 10 | 10 | 10 |  | 10 |  | 10 |
| $Nb_2O_5$ | 26 | 26 | 26 | 26 | 26 | 31 | 26 | 31 | 26 |
| $P_2O_5$ | 25 | 25 | 25 | 25 | 25 | 25 | 25 | 25 | 25 |
| Properties | | | | | | | | | |
| Density (g/cm³) | 3.797 | 3.746 | 3.779 | 3.557 | 3.979 | 4.097 | 3.687 | 3.792 | 3.874 |
| n519 | 1.928 | 1.901 | 1.91 | 1.91 | 1.899 | 1.889 | 1.906 | 1.894 | 1.899 |
| nD | 1.911 | 1.885 | 1.894 | 1.894 | 1.884 | 1.875 | 1.89 | 1.879 | 1.884 |
| n633 | 1.901 | 1.876 | 1.884 | 1.884 | 1.874 | 1.866 | 1.88 | 1.87 | 1.874 |
| $T_g$ |  |  |  | 620 | 628 |  | 614 |  | 617 |
| $T_x$ |  |  |  | 723 | 811 |  | 747 |  | 804 |
| $T_x - T_g$ |  |  |  | 103 | 183 |  | 133 |  | 187 |
| Nanostrip (mg/cm²) | <0.001 | 0.014 | 0.044 |  |  |  |  |  |  |

TABLE 20

| Component | 164 | 165 | 166 | 167 | 168 | 169 | 170 | 171 | 172 |
|---|---|---|---|---|---|---|---|---|---|
| $Li_2O$ | 6.6 | 6.6 | 6.6 | 5 | 5 | 5 | 3.3 | 3.3 | 3.3 |
| $Na_2O$ | 6.8 | 6.8 | 6.8 | 5 | 5 | 5 | 3.4 | 3.4 | 3.4 |
| $K_2O$ | 6.6 | 6.6 | 6.6 | 5 | 5 | 5 | 3.3 | 3.3 | 3.3 |
| CaO | 5 | 7 | 8 | 7 | 8 | 10 | 8 | 10 | 12 |
| SrO | 4.5 | 6 | 8 | 6 | 8 | 9.5 | 8 | 9.5 | 11 |
| BaO | 4.5 | 6 | 8 | 6 | 8 | 9.5 | 8 | 9.5 | 11 |
| $TiO_2$ | 20 | 10 |  | 20 | 10 |  | 20 | 10 |  |
| $Nb_2O_5$ | 21 | 26 | 31 | 21 | 26 | 31 | 21 | 26 | 31 |
| $P_2O_5$ | 25 | 25 | 25 | 25 | 25 | 25 | 25 | 25 | 25 |
| Properties | | | | | | | | | |
| Density (g/cm³) | 3.585 | 3.694 | 3.795 | 3.663 | 3.781 | 3.876 | 3.759 | 3.857 | 3.948 |
| n532 | 1.903 | 1.893 | 1.882 | 1.912 | 1.901 | 1.89 | 1.922 | 1.909 | 1.898 |
| nD | 1.89 | 1.881 | 1.871 | 1.899 | 1.889 | 1.879 | 1.909 | 1.897 | 1.887 |
| n633 | 1.88 | 1.872 | 1.862 | 1.89 | 1.88 | 1.87 | 1.899 | 1.888 | 1.878 |
| $T_g$ | 607 | 604 | 602 | 625 | 623 | 622 | 638 | 637 | 633 |

TABLE 20-continued

| Component | 164 | 165 | 166 | 167 | 168 | 169 | 170 | 171 | 172 |
|---|---|---|---|---|---|---|---|---|---|
| $T_x$ | 769 | 758 | 730 | 787 | 787 | 751 | 815 | 811 | 770 |
| $T_x - T_g$ | 162 | 155 | 127 | 162 | 165 | 130 | 177 | 175 | 137 |

TABLE 21

| Component | 173 | 174 | 175 | 176 | 177 |
|---|---|---|---|---|---|
| $Li_2O$ | 5 | 5 | 5 | 5 | 5 |
| $Na_2O$ | 5 | 5 | 5 | 5 | 5 |
| $K_2O$ | 5 | 5 | 5 | 5 | 5 |
| CaO | 5 | 5 | 7 | 5 | 8 |
| SrO | | 3 | | 5 | |
| BaO | 4 | 5 | 6 | 5 | 7 |
| ZnO | 4 | | | | |
| $TiO_2$ | 15 | 15 | 15 | 10 | 10 |
| $Nb_2O_5$ | 32 | 32 | 32 | 35 | 35 |
| $P_2O_5$ | 25 | 25 | 25 | 25 | 25 |

TABLE 21-continued

| Component | 173 | 174 | 175 | 176 | 177 |
|---|---|---|---|---|---|
| Properties | | | | | |
| Density (g/cm³) | 3.747 | 3.766 | 3.759 | 3.823 | 3.825 |
| n532 | 1.99 | 1.981 | 1.981 | 1.98 | 1.985 |
| nD | 1.974 | 1.966 | 1.966 | 1.965 | 1.97 |
| n633 | 1.962 | 1.954 | 1.954 | 1.954 | 1.958 |
| Nanostrip (mg/cm²) | | 0.012 | 0.014 | 0.013 | 0.006 |

Glass compositions as disclosed herein having refractive index higher than 1.8 are presented in Tables 22 through 25 along with selected properties. Abbreviations representing properties not already listed previously herein are reviewed below:

TABLE 22

| Composition | 178 | 179 | 180 | 181 | 182 | 183 | 184 | 188 | 188 | 187 | 188 |
|---|---|---|---|---|---|---|---|---|---|---|---|
| Mol % Batched | | | | | | | | | | | |
| $P_2O_5$ | 30 | 30 | 30 | 27.5 | 25 | 25 | 25 | 30 | 30 | 30 | 30 |
| $Na_2O$ | 25 | 15 | 25 | | 15 | 5 | | | 5 | | |
| BaO | | 10 | | | 5 | 10 | 12.5 | 17.5 | 10 | 12.5 | 12.5 |
| SrO | | | | 32.5 | 5 | 10 | 12.5 | 17.5 | 10 | 12.5 | 12.5 |
| ZnO | | | | | 5 | 5 | 5 | | | | 10 |
| $TiO_2$ | 10 | 25 | 10 | 15 | 10 | 10 | 10 | | 10 | 10 | |
| $Nb_2O_5$ | 35 | 20 | 30 | 20 | 35 | 35 | 35 | 35 | 30 | 30 | 30 |
| $WO_3$ | | | 5 | 5 | | | | | 5 | 5 | 5 |
| Compositional Reduced | | | | | | | | | | | |
| $P_2O_5$ | 30 | 30 | 30 | 28 | 25 | 25 | 25 | 30 | 30 | 30 | 30 |
| $R_2O$ | 25 | 15 | 25 | 0 | 15 | 5 | 0 | 0 | 5 | 0 | 0 |
| RO | 0 | 10 | 0 | 33 | 10 | 20 | 25 | 35 | 20 | 25 | 25 |
| ZnO | 0 | 0 | 0 | 0 | 5 | 5 | 5 | 0 | 0 | 0 | 10 |
| $TiO_2$ | 10 | 25 | 10 | 15 | 10 | 10 | 10 | 0 | 10 | 10 | 0 |
| $Nb_2O_5$ | 35 | 20 | 30 | 20 | 35 | 35 | 35 | 35 | 30 | 30 | 30 |
| $WO_3$ | 0 | 0 | 5 | 5 | 0 | 0 | 0 | 0 | 5 | 5 | 5 |
| $(R_2O + RO)/P_2O_5$ | 0.83 | 0.83 | 0.83 | 1.18 | 1.00 | 1.00 | 1.00 | 1.17 | 0.83 | 0.83 | 0.83 |
| $R_2O + RO + ZnO$ | 25 | 25 | 25 | 33 | 30 | 30 | 30 | 35 | 25 | 25 | 35 |
| $R_2O/(R_2O + RO)$ | 1 | 1 | 1 | 0 | 1 | 0 | 0 | 0 | 0 | 0 | 0 |
| Properties | | | | | | | | | | | |
| Density (g/cm³) | 3.523 | 3.564 | 3.587 | 3.949 | 3.823 | 3.983 | 4.093 | 4.054 | 3.922 | 4.006 | 4.075 |
| nD | 1.9039 | 1.9292 | 1.8600 | 1.8808 | 1.9572 | 1.9739 | 1.9783 | 1.8992 | 1.9228 | 1.9293 | 1.8921 |
| $V_d$ | 20.86 | | | 22.17 | 18.88 | 19.56 | 19.41 | 22.20 | 19.94 | 20.25 | 22.38 |
| CTE (<300° C., on heating) (ppm/° C.) | 7.6 | 7.8 | | | 7.2 | 6.6 | 6.1 | 6.9 | 6.0 | 6.0 | 5.9 |
| Annealing Point (13) (° C.) | 656 | 655 | | | 633 | 652 | 676 | 712 | 683 | 715 | 663 |
| Strain Point (14.5) (° C.) | 623 | 621 | | | 600 | 618 | 643 | 678 | 649 | 680 | 628 |
| Softening Point (7.6) (° C.) | 763 | 766 | 754 | | | | | 827 | 806 | 818 | 786 |
| $T_{g\ onset}$ (° C.) | 669 | 670 | 655 | 700 | 644 | 665 | 690 | 723 | 698 | 724 | 675 |
| $T_{x\ onset}$ (° C.) | 841 | 829 | 854 | 855 | 748 | 775 | 792 | 888 | 857 | 877 | 842 |
| $T_{x\ onset} - T_g$ (° C.) | 172 | 159 | 200 | 155 | 104 | 110 | 103 | 165 | 159 | 154 | 167 |
| Liquidus Internal (° C.) | 1155 | | | | | | | | | | |

TABLE 22-continued

| Composition | 178 | 179 | 180 | 181 | 182 | 183 | 184 | 188 | 188 | 187 | 188 |
|---|---|---|---|---|---|---|---|---|---|---|---|
| AO weight loss (mg/mm$^2$) | 2.00E−04 | 4.16E−05 | | | | | | | | | |
| Nanostrip (mg/mm$^2$) | <2E−06 | 8.32E−05 | | | | | | | | | |
| Poisson's Ratio | 0.242 | 0.242 | | | 0.249 | 0.251 | 0.255 | 0.247 | 0.241 | 0.247 | 0.258 |
| Shear Modulus (GPa) | 38.2 | 38.4 | | | 40.4 | 40.8 | 40.0 | 36.2 | 37.5 | 38.7 | 36.7 |
| Young's Modulus (GPa) | 94.9 | 95.4 | | | 100.9 | 102.0 | 100.3 | 90.5 | 93.1 | 96.4 | 92.2 |

TABLE 23

| Composition | 189 | 190 | 191 | 192 | 193 | 194 | 195 | 196 | 197 | 198 |
|---|---|---|---|---|---|---|---|---|---|---|
| Mol % Batched | | | | | | | | | | |
| $P_2O_5$ | 25 | 20 | 30 | 30 | 30 | 25 | 30 | 30 | 30 | 30 |
| $Li_2O$ | 5 | 5 | | | | | | | | |
| $Na_2O$ | 5 | 5 | 20 | 15 | 20 | | 25 | 25 | 25 | 25 |
| $K_2O$ | 5 | 5 | | | 5 | 5 | | | | |
| CaO | 15 | 15 | | | | 1 | | | | |
| BaO | 15 | 15 | 5 | 10 | | 25 | | | | |
| SrO | | | | | 5 | | | | | |
| ZnO | | | 10 | 10 | | | | | | |
| $TiO_2$ | 10 | 10 | 10 | | 5 | 22 | 10 | 10 | 10 | 10 |
| $Nb_2O_5$ | 20 | 25 | 25 | 30 | 35 | 22 | 35 | 35 | 35 | 35 |
| $WO_3$ | | | | 5 | | | | | | |
| $CeO_2$ | 0.1 | 0.1 | 0.01 | | | | | 0.001 | 0.01 | 0.1 |
| Compositional Reduced | | | | | | | | | | |
| $P_2O_5$ | 25 | 20 | 30 | 30 | 30 | 25 | 30 | 30 | 30 | 30 |
| $R_2O$ | 15 | 15 | 20 | 15 | 25 | 5 | 25 | 25 | 25 | 25 |
| RO | 30 | 30 | 5 | 10 | 5 | 26 | 0 | 0 | 0 | 0 |
| ZnO | 0 | 0 | 10 | 10 | 0 | 0 | 0 | 0 | 0 | 0 |
| $TiO_2$ | 10 | 10 | 10 | 0 | 5 | 22 | 10 | 10 | 10 | 10 |
| $Nb_2O_5$ | 20 | 25 | 25 | 30 | 35 | 22 | 35 | 35 | 35 | 35 |
| $WO_3$ | 0 | 0 | 0 | 5 | 0 | 0 | 0 | 0 | 0 | 0 |
| $(R_2O + RO)/P_2O_5$ | 1.80 | 2.25 | 0.83 | 0.83 | 1.00 | 1.24 | 0.83 | 0.83 | 0.83 | 0.83 |
| $R_2O + RO + ZnO$ | 45 | 45 | 35 | 35 | | | | | | |
| $R_2O/(R_2O + RO)$ | 0 | 0 | 1 | 1 | | | | | | |
| Properties | | | | | | | | | | |
| Density (g/cm$^3$) | 3.803 | 3.879 | 3.512 | 3.885 | 3.54 | 3.957 | 3.515 | 3.523 | 3.483 | 3.522 |
| nD | 1.8797 | 1.8995 | 1.8612 | 1.8600 | 1.8664 | 1.9096 | 1.9051 | 1.9034 | 1.9037 | 1.9038 |
| $V_d$ | 23.77 | 22.75 | 22.00 | | 21.20 | 21.19 | | | | |
| Softening Point (° C.) | 720 | | | | | | | | | |
| $T_{g\ onset}$ (° C.) | 621 | 600 | 610 | 606 | | | 676 | | | |
| $T_{x\ onset}$ (° C.) | 803 | 710 | 827 | 837 | | | 851 | | | |
| $T_{x\ onset} - T_{g\ onset}$ (° C.) | 181 | 110 | 216 | 231 | | | 176 | | | |

TABLE 24

| Composition | 199 | 200 | 201 | 202 | 203 | 204 | 205 | 206 | 207 | 208 |
|---|---|---|---|---|---|---|---|---|---|---|
| Mol % Batched | | | | | | | | | | |
| $P_2O_5$ | 30 | 30 | 30 | 30 | 25 | 30 | 30 | 30 | 25 | 30 |
| $Na_2O$ | 15 | 15 | 15 | 15 | 25 | 25 | | 15 | 25 | 25 |
| $K_2O$ | | | | | | | 25 | | | |
| BaO | 10 | 10 | 10 | 10 | | | | | | |
| SrO | | | | | | | | 10 | | |
| $TiO_2$ | 25 | 25 | 25 | 25 | 10 | 10 | 10 | 10 | 10 | 10 |
| $Nb_2O_5$ | 20 | 20 | 20 | 20 | 35 | 35 | 35 | 35 | 35 | 35 |
| $WO_3$ | | | | | 5 | | | | 5 | |
| $CeO_2$ | | 0.001 | 0.01 | 0.1 | | | | | | |
| Compositional Reduced | | | | | | | | | | |
| $P_2O_5$ | 30 | 30 | 30 | 30 | 25 | 30 | 30 | 30 | 25 | 30 |
| $R_2O$ | 15 | 15 | 15 | 15 | 25 | 25 | 25 | 15 | 25 | 25 |
| RO | 10 | 10 | 10 | 10 | 0 | 0 | 0 | 10 | 0 | 0 |

TABLE 24-continued

| Composition | 199 | 200 | 201 | 202 | 203 | 204 | 205 | 206 | 207 | 208 |
|---|---|---|---|---|---|---|---|---|---|---|
| $TiO_2$ | 25 | 25 | 25 | 25 | 10 | 10 | 10 | 10 | 10 | 10 |
| $Nb_2O_5$ | 20 | 20 | 20 | 20 | 35 | 35 | 35 | 35 | 35 | 35 |
| $WO_3$ | 0 | 0 | 0 | 0 | 5 | 0 | 0 | 0 | 5 | 0 |
| $(R_2O + RO)/P_2O_5$ | 0.83 | 0.83 | 0.83 | 0.83 | 1.00 | 0.83 | 0.83 | 0.83 | 1.00 | 0.83 |
| $R_2O + RO$ | 25 | 25 | 25 | 25 | 25 | 25 | 25 | 25 | 25 | 25 |
| $R_2O/(R_2O + RO)$ | 0.60 | 0.60 | 0.60 | 0.60 | 1 | 1 | 1 | 0.60 | 1 | 1 |
| Properties | | | | | | | | | | |
| Density (g/cm³) | 3.55 | 3.55 | 3.549 | 3.55 | 3.726 | 3.533 | 3.442 | 3.678 | 3.748 | |
| nD | 1.8828 | 1.8828 | 1.8823 | 1.8824 | 1.9476 | 1.9021 | 1.8614 | 1.9252 | 1.9470 | 1.9178 |
| $T_{g\ onset}$ (° C.) | | | | | 653 | 675 | 714 | 686 | 654 | |
| $T_{x\ onset}$ (° C.) | | | | | 770 | 860 | 852 | 866 | 772 | |
| $T_{x\ onset} - T_{g\ onset}$ (° C.) | | | | | 117 | 184 | 138 | 181 | 117 | |

TABLE 25

| Composition | 209 | 210 | 211 | 212 | 213 | 214 | 215 | 216 | 217 | 218 |
|---|---|---|---|---|---|---|---|---|---|---|
| Mol % Batched | | | | | | | | | | |
| $P_2O_5$ | 30 | 30 | 30 | 25 | 30 | 30 | 30 | 25 | 25 | 25 |
| $Na_2O$ | 15 | 10 | 10 | | | 7.64 | 18.25 | 20 | 20 | 20 |
| $K_2O$ | | 5 | 5 | | 25 | 17.36 | 6.75 | | | |
| CaO | | | | 5 | | | | | | |
| BaO | 10 | 10 | 5 | 12.5 | | | | 20 | 20 | 20 |
| SrO | | | 5 | 12.5 | | | | | | |
| $TiO_2$ | 25 | 25 | 25 | 10 | 10 | 10 | 10 | | | |
| $Nb_2O_5$ | 20 | 20 | 20 | 35 | 35 | 35 | 35 | 35 | 35 | 35 |
| Compositional Reduced | | | | | | | | | | |
| $P_2O_5$ | 30 | 30 | 30 | 25 | 30 | 30 | 30 | 25 | 25 | 25 |
| $R_2O$ | 15 | 15 | 15 | 0 | 25 | 25 | 25 | 20 | 20 | 20 |
| RO | 10 | 10 | 10 | 30 | 0 | 0 | 0 | 20 | 20 | 20 |
| $TiO_2$ | 25 | 25 | 25 | 10 | 10 | 10 | 10 | 0 | 0 | 0 |
| $Nb_2O_5$ | 20 | 20 | 20 | 35 | 35 | 35 | 35 | 35 | 35 | 35 |
| $(R_2O + RO)/P_2O_5$ | 0.83 | 0.83 | 0.83 | 1.20 | 0.83 | 0.83 | 0.83 | 1.60 | 1.60 | 1.60 |
| $R_2O + RO$ | 25 | 25 | 25 | 30 | 25 | 25 | 25 | 40 | 40 | 40 |
| $R_2O/(R_2O + RO)$ | 0.60 | 0.60 | 0.60 | 0 | 1 | 1 | 1 | 0.50 | 0.50 | 0.50 |
| Properties | | | | | | | | | | |
| Density (g/cm³) | | 3.611 | 3.535 | 4.046 | | | | | | |
| nD | 1.8896 | 1.9172 | 1.9099 | 1.9846 | 1.8600 | 1.8800 | 1.9000 | 1.8886 | 1.8888 | 1.8896 |

Example 4: Controlling the Color of the Glass

A couple of different approaches were examined to control the color of the glass compositions.

Figure 1B:
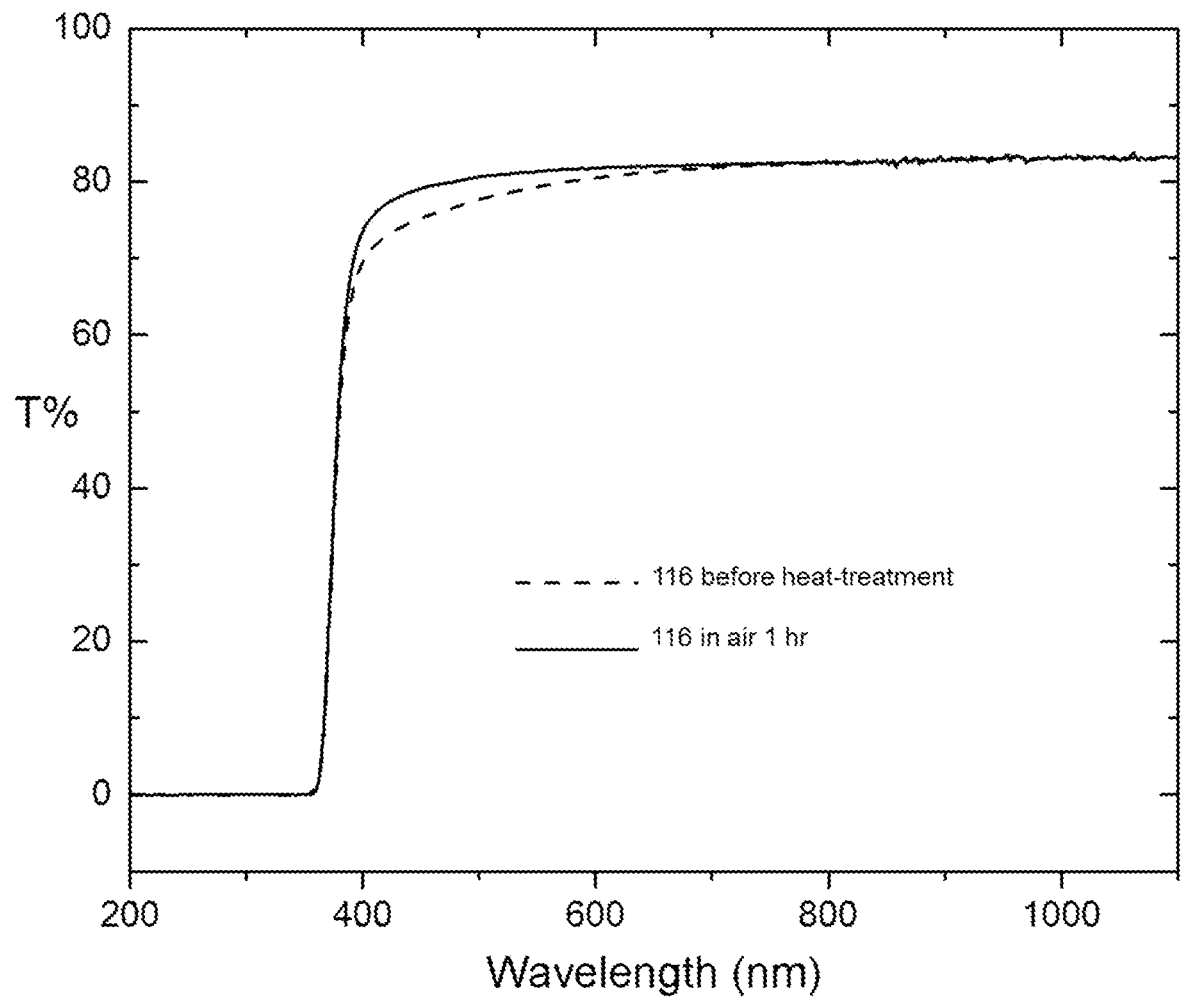

In one experiment, glass composition 116 (Table 13) was heated at 660° C. with oxygen purge for 0.5 hour and 1 hour (FIG. 1A) and in air at 640° C. for 1 hour (FIG. 1B). Heat-treatment under both conditions bleached the color of the glass and improved the transmittance in the range of 350-500 μm as shown in FIGS. 1A and 1B.

Figure 2:
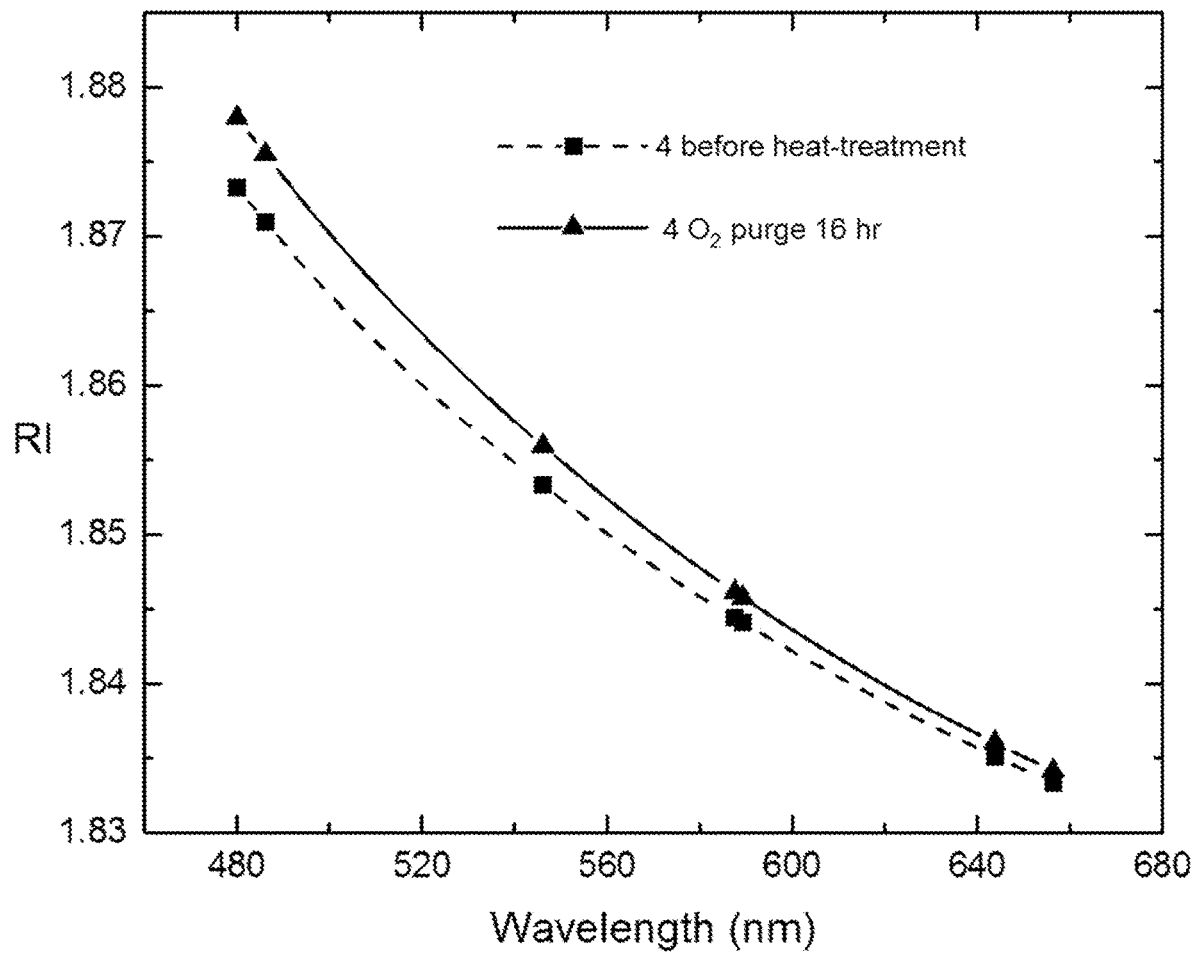
FIG. 2 shows the refractive index of a glass composition that was heated at 660° C. with oxygen purge for 16 hours compared to the same glass that was not heated under oxygen.

In another experiment, glass composition 4 (Table 1) was heated at 660° C. with oxygen purge for 16 hours. As shown in FIG. 2, the glass composition that was heated under oxygen increased the refractive index of the glass compared to the same glass that was not heated under oxygen.

Figure 3A:
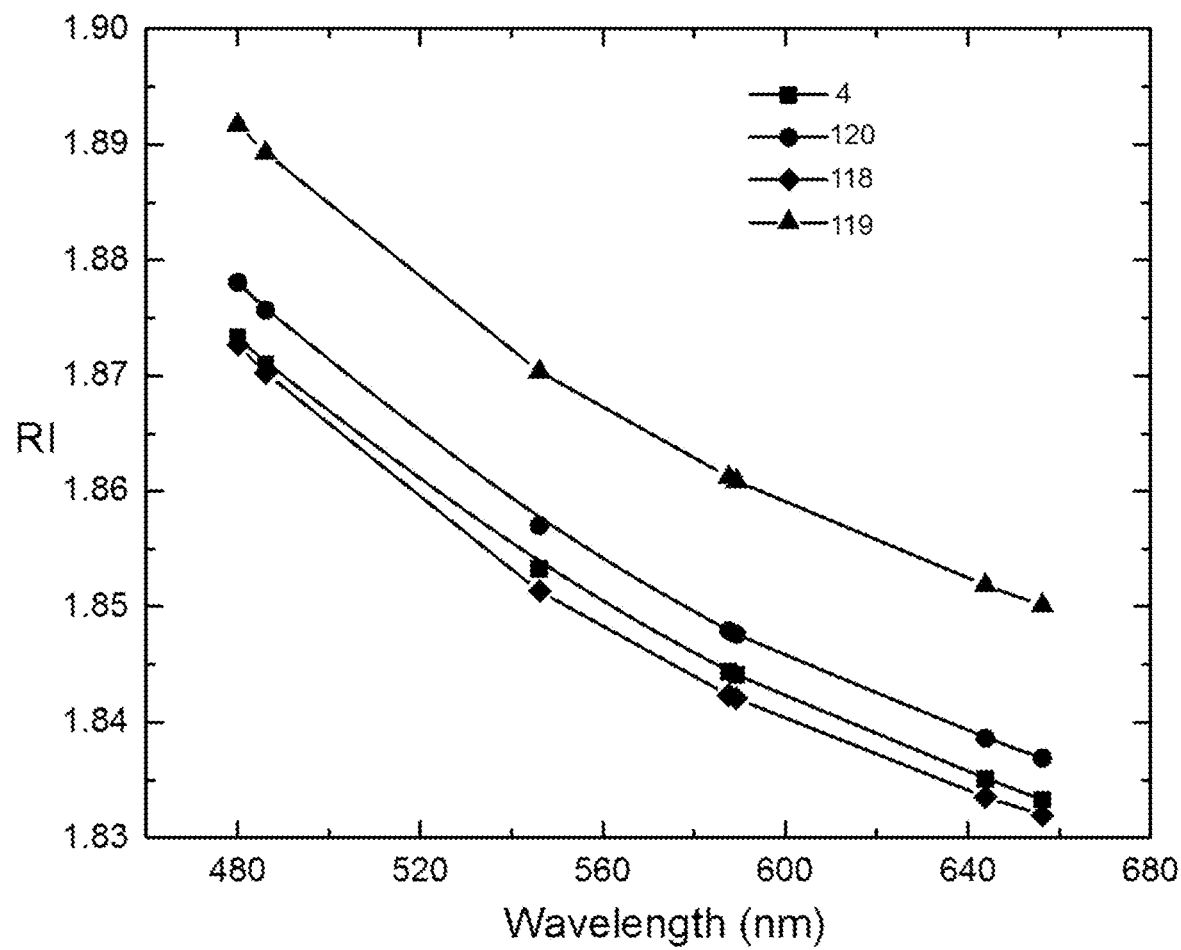
FIGS. 3A and 3B show that glass compositions that include $CeO_2$ have a higher refractive index and transmittance, respectively, compared to a glass composition that does not include $CeO_2$.
Figure 3B:
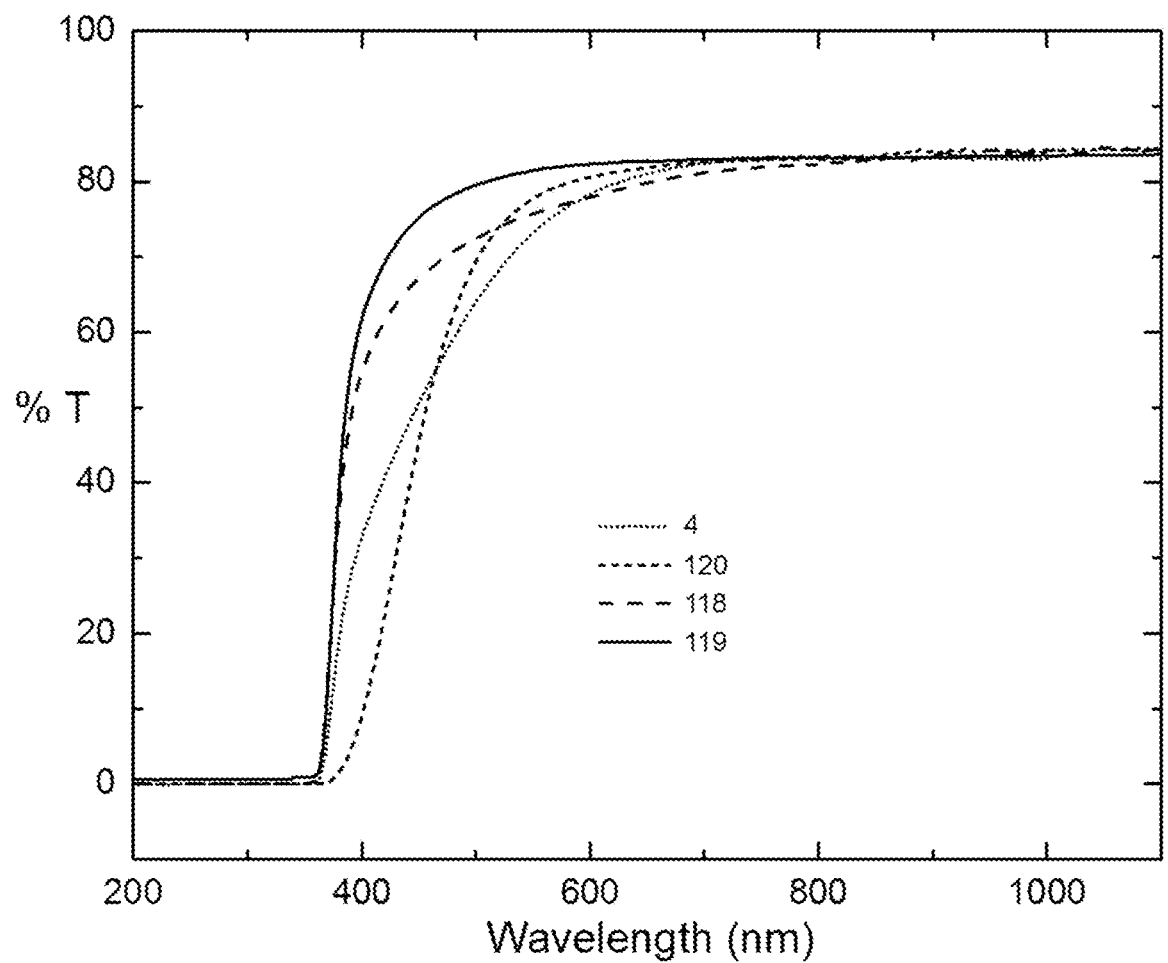

In another experiment, the addition of $CeO_2$ was added to several glass compositions produced herein in order to modify the color of the glass (Table 26). Glass composition 4 did not include $CeO_2$ and was used as the control. Glass compositions 118-120 contained from 0.01-1 mol % mol % $CeO_2$. The glass compositions prepared with $CeO_2$ in general had a higher refractive index (FIG. 3A) and percent transmittance (FIG. 3B) compared to glass composition 4.

TABLE 26

| Base glass (without $CeO_2$) | Base glass with $CeO_2$ addition (0.001-1 mol %) |
|---|---|
| 4 | 117 (0.001% $CeO_2$), 118 (0.01% $CeO_2$), 119 (0.1% $CeO_2$), 120 (0.8% $CeO_2$) |
| 3 | 121 (0.8% $CeO_2$) |
| 45 | 122 (0.02% $CeO_2$), 123 (0.2% $CeO_2$) |
| 87 | 124 (0.02% $CeO_2$), 125 (0.2% $CeO_2$) |
| 94 | 126 (0.2% $CeO_2$), 127 (0.02% $CeO_2$) |

Clause 1 of the present disclosure extends to:
A glass composition comprising:
(a) $P_2O_5$ in an amount of 15 mol % to 40 mol %;
(b) $Nb_2O_5$ is in an amount of 10 mol % to 50 mol %; and
one of the following:
(i) an alkali metal oxide ($R_2O$) in an amount of 1 mol % to 35 mol %; at least two alkaline earth metal oxides (RO) in a combined amount of 5 mol % to 40 mol %, and
wherein the glass composition does not include ZnO and $B_2O_3$;
(ii) at least one alkali metal oxide ($R_2O$) in an amount of 5 mol % to 35 mol %; and wherein the glass composition does not include ZnO, $B_2O_3$, or an alkaline earth metal oxide (RO); or (iii) at least one alkaline earth metal oxide (RO) in an amount of 5 mol % to 40 mol %; and
wherein the glass composition does not include ZnO, $B_2O_3$, or an alkali metal oxide ($R_2O$).

Clause 2 of the present disclosure extends to:
The glass composition of clause 1, wherein the composition comprises
an alkali metal oxide ($R_2O$) in an amount of 5 mol % to 35 mol %;
at least two alkaline earth metal oxides (RO) in a combined amount of 5 mol % to 40 mol %, and
wherein the glass composition does not include ZnO and $B_2O_3$.

Clause 3 of the present disclosure extends to:
The glass composition of clauses 1 or 2, wherein the molar ratio of ($R_2O$+RO)/$P_2O_5$ is greater than or equal to 1.

Clause 4 of the present disclosure extends to:
The glass composition of clauses 1 or 2, wherein the molar ratio of ($R_2O$+RO)/$P_2O_5$ is less than or equal to 1.

Clause 5 of the present disclosure extends to:
The glass composition of clauses 1 or 2, wherein the molar ratio of $R_2O$/($R_2O$+RO) is greater than 0.25.

Clause 6 of the present disclosure extends to:
The glass composition of any of clauses 1-5, wherein $P_2O_5$ is in the amount of 15 mol % to 30 mol %.

Clause 7 of the present disclosure extends to:
The glass composition of any of clauses 1-6, wherein $Nb_2O_5$ is in the amount of 15 mol % to 30 mol %.

Clause 8 of the present disclosure extends to:
The glass composition of any of clauses 1-7, wherein $P_2O_5$ is in the amount of 20 mol % to 30 mol %.

Clause 9 of the present disclosure extends to:
The glass composition of any of clauses 1-8, wherein $Nb_2O_5$ is in the amount of 20 mol % to 30 mol %.

Clause 10 of the present disclosure extends to:
The glass composition of any of clauses 1-9, wherein $R_2O$ is $Na_2O$, $Li_2O$, $K_2O$, or any combination thereof.

Clause 11 of the present disclosure extends to:
The glass composition of any of clauses 1-10, wherein $R_2O$ comprises $Na_2O$ in the amount of 1 mol % to 35 mol %.

Clause 12 of the present disclosure extends to:
The glass composition of any of clauses 1-11, wherein $R_2O$ comprises $Li_2O$ in the amount of 1 mol % to 15 mol %.

Clause 13 of the present disclosure extends to:
The glass composition of any of clauses 1-12, wherein $R_2O$ comprises $K_2O$ in the amount of 1 mol % to 10 mol %.

Clause 14 of the present disclosure extends to:
The glass composition of any of clauses 1-13, wherein $R_2O$ comprises $Na_2O$ in the amount of 1 mol % to 15 mol %, $Li_2O$ in the amount of 1 mol % to 15 mol %, $K_2O$ in the amount of 1 mol % to 10 mol %, or any combination thereof.

Clause 15 of the present disclosure extends to:
The glass composition of any of clauses 1-14, wherein RO comprises BaO in the amount of 1 mol % to 25 mol % and CaO in the amount of 1 mol % to 25 mol %.

Clause 16 of the present disclosure extends to:
The glass composition of any of clauses 1-15, wherein RO comprises BaO in the amount of 1 mol % to 25 mol % and MgO in the amount of 1 mol % to 25 mol %.

Clause 17 of the present disclosure extends to:
The glass composition of any of clauses 1-16, wherein RO comprises BaO in the amount of 1 mol % to 25 mol %, CaO in the amount of 1 mol % to 25 mol %, SrO in the amount of 1 mol % to 25 mol %, or any combination thereof.

Clause 18 of the present disclosure extends to:
The glass composition of any of clauses 1-17, wherein $R_2O$ comprises $Na_2O$ in the amount of 1 mol % to 15 mol %, $Li_2O$ in the amount of 1 mol % to 15 mol %, and $K_2O$ in the amount of 1 mol % to 10 mol %, and RO comprises BaO in the amount of 1 mol % to 25 mol %, CaO in the amount of 1 mol % to 25 mol %, and SrO in the amount of 1 mol % to 25 mol %.

Clause 19 of the present disclosure extends to:
The glass composition of any of clauses 1-18, wherein the composition further comprises $TiO_2$ and/or $WO_3$, wherein the amount of $Nb_2O_5$ an amount of $TiO_2$ and/or an amount of $WO_3$, or any combination thereof, sums to 20 mol % to 50 mol %.

Clause 20 of the present disclosure extends to:
The glass composition of any of clauses 1-19, wherein the composition further comprises $TiO_2$ in an amount of 1 mol % to 30 mol %.

Clause 21 of the present disclosure extends to:
The glass composition of any of clauses 1-20, wherein the composition further comprises $WO_3$ in an amount of 1 mol % to 15 mol %.

Clause 22 of the present disclosure extends to:
The glass composition of any of clauses 1-21, wherein the composition further comprises $Al_2O_3$ in an amount of 1 mol % to 5 mol %.

Clause 23 of the present disclosure extends to:
The glass composition of any of clauses 1-22, wherein the composition further comprises $CeO_2$ in an amount of 0.001 mol % to 1.0 mol %.

Clause 24 of the present disclosure extends to:
The glass composition of any of clauses 1-23, wherein the glass composition does not include $SiO_2$, $Al_2O_3$, MgO, $TiO_2$, or any combination thereof.

Clause 25 of the present disclosure extends to:
The glass composition of any of clauses 1-24, wherein the glass composition comprises $Nb_2O_5$ in the amount of 15 mol % to 25 mol % and $TiO_2$ in the amount of 15 mol % to 25 mol %.

Clause 26 of the present disclosure extends to:
The glass composition of any of clauses 1-25, wherein the sum of $Nb_2O_5$ and $TiO_2$ is 40 mol % to 50 mol %.

Clause 27 of the present disclosure extends to:
The glass composition of any of clauses 1-26, wherein the glass composition comprises $Nb_2O_5$ in the amount of 15 mol % to 25 mol %, $TiO_2$ in the amount of 15 mol % to 25 mol %, and $P_2O_5$ in an amount of 20 mol % to 30 mol %.

Clause 28 of the present disclosure extends to:
The glass composition of any of clauses 1-27, wherein the sum of $Nb_2O_5$ and $TiO_2$ is 40 mol % to 50 mol %.

Clause 29 of the present disclosure extends to:
The glass composition of clause 1, wherein the composition comprises
at least one alkali metal oxide ($R_2O$) in an amount of 5 mol % to 35 mol %; and wherein the glass composition does not include ZnO, $B_2O_3$, or an alkaline earth metal oxide (RO).

Clause 30 of the present disclosure extends to:
The glass composition of clause 29, wherein the molar ratio of $R_2O$/$P_2O_5$ is greater than or equal to 1.

Clause 31 of the present disclosure extends to:
The glass composition of clause 29, wherein the molar ratio of $R_2O$/$P_2O_5$ is less than or equal to 1.

Clause 32 of the present disclosure extends to:
The glass composition of any of clauses 29-31, wherein the glass composition comprises $Nb_2O_5$ in the amount of 30 mol % to 40 mol % and $TiO_2$ in the amount of 5 mol % to 15 mol %.

Clause 33 of the present disclosure extends to:
The glass composition of any of clauses 29-32, wherein the sum of $Nb_2O_5$ and $TiO_2$ is 40 mol % to 50 mol %.

Clause 34 of the present disclosure extends to:
The glass composition of any of clauses 29-33, wherein the glass composition comprises $Nb_2O_5$ in the amount of 30 mol % to 40 mol % and $TiO_2$ in the amount of 5 mol % to 15 mol %, and $P_2O_5$ in an amount of 20 mol % to 30 mol %.

Clause 35 of the present disclosure extends to:
The glass composition of any of clauses 29-34, wherein the sum of $Nb_2O_5$ and $TiO_2$ is 40 mol % to 50 mol %.

Clause 36 of the present disclosure extends to:
The glass composition of any of clauses 29-35, wherein $R_2O$ is $Na_2O$, $Li_2O$, $K_2O$, or any combination thereof.

Clause 37 of the present disclosure extends to:
The glass composition of any of clauses 29-36, wherein $R_2O$ comprises $Na_2O$ in the amount of 5 mol % to 40 mol %, $Li_2O$ in the amount of 5 mol % to 40 mol %, $K_2O$ in the amount of 5 mol % to 40 mol %, or any combination thereof.

Clause 38 of the present disclosure extends to:
The glass composition of any of clauses 29-37, wherein the glass composition comprises $Nb_2O_5$ in the amount of 30 mol % to 40 mol % and $TiO_2$ in the amount of 5 mol % to 15 mol %, $P_2O_5$ in an amount of 20 mol % to 30 mol %, and $R_2O$ comprises $Na_2O$ in the amount of 5 mol % to 40 mol %, $Li_2O$ in the amount of 5 mol % to 40 mol %, $K_2O$ in the amount of 5 mol % to 40 mol %, or any combination thereof.

Clause 39 of the present disclosure extends to:
The glass composition of any of clauses 29-38, wherein the composition further comprises $WO_3$ in an amount of 1 mol % to 15 mol %.

Clause 40 of the present disclosure extends to:
The glass composition of clause 1, wherein the composition comprises
at least one alkaline earth metal oxide (RO) in an amount of 5 mol % to 40 mol %,
wherein the glass composition does not include ZnO, $B_2O_3$, or an alkali metal oxide ($R_2O$).

Clause 41 of the present disclosure extends to:
The glass composition of clause 40, wherein the molar ratio of $RO/P_2O_5$ is greater than or equal to 1.

Clause 42 of the present disclosure extends to:
The glass composition of clause 40, wherein the molar ratio of $RO/P_2O_5$ is less than or equal to 1.

Clause 43 of the present disclosure extends to:
The glass composition of any of clauses 40-42, wherein the glass composition comprises $Nb_2O_5$ in the amount of 30 mol % to 40 mol % and $TiO_2$ in the amount of 5 mol % to 15 mol %.

Clause 44 of the present disclosure extends to:
The glass composition of any of clauses 40-43, wherein the sum of $Nb_2O_5$ and $TiO_2$ is 40 mol % to 50 mol %.

Clause 45 of the present disclosure extends to:
The glass composition of any of clauses 40-44, wherein the glass composition comprises $Nb_2O_5$ in the amount of 30 mol % to 40 mol %, $TiO_2$ in the amount of 5 mol % to 15 mol %, and $P_2O_5$ in an amount of 20 mol % to 30 mol %.

Clause 46 of the present disclosure extends to:
The glass composition of any of clauses 40-45, wherein the sum of $Nb_2O_5$ and $TiO_2$ is 40 mol % to 50 mol %.

Clause 47 of the present disclosure extends to:
The glass composition of any of clauses 40-46, wherein RO comprises BaO, CaO, SrO or any combination thereof.

Clause 48 of the present disclosure extends to:
The glass composition of any of clauses 40-47, wherein RO comprises BaO in the amount of 1 mol % to 25 mol %, CaO in the amount of 1 mol % to 25 mol %, SrO in the amount of 1 mol % to 25 mol %, or any combination thereof.

Clause 49 of the present disclosure extends to:
The glass composition of any of clauses 40-48, wherein the glass composition comprises $Nb_2O_5$ in the amount of 30 mol % to 40 mol %, $TiO_2$ in the amount of 5 mol % to 15 mol %, $P_2O_5$ in an amount of 20 mol % to 30 mol %, BaO in the amount of 5 mol % to 20 mol %, CaO in the amount of 1 mol % to 10 mol %, and SrO in the amount of 5 mol % to 20 mol %.

Clause 50 of the present disclosure extends to:
A glass composition comprising:
$P_2O_5$ in an amount of 20 mol % to 40 mol %;
$Nb_2O_5$ in an amount of 10 mol % to 50 mol %;
ZnO in an amount of 0.5 mol % to 20 mol %; and one of the following:
(i) an alkali metal oxide ($R_2O$) in an amount of 1 mol % to 35 mol %; an alkaline earth metal oxide (RO) in an amount of 5 mol % to 40 mol %,
wherein the glass composition does not include $B_2O_3$;
(ii) at least one alkali metal oxide ($R_2O$) in an amount of 5 mol % to 35 mol %;
wherein the glass composition does not include $B_2O_3$ or an alkaline earth metal oxide (RO); or
(iii) at least one alkaline earth metal oxide (RO) in an amount of 5 mol % to 40 mol %;
wherein the glass composition does not include $B_2O_3$ or an alkali metal oxide ($R_2O$).

Clause 51 of the present disclosure extends to:
The glass composition of clause 50, wherein the composition comprises
an alkali metal oxide ($R_2O$) in an amount of 10 mol % to 35 mol %;
an alkaline earth metal oxide (RO) in an amount of 5 mol % to 40 mol %, and
wherein the glass composition does not include $B_2O_3$.

Clause 52 of the present disclosure extends to:
The glass composition of clauses 50 or 51, wherein the amount of RO, the amount of $R_2O$, and the amount of ZnO sum to 30 mol % to 60 mol %.

Clause 53 of the present disclosure extends to:
The glass composition of clauses 50 or 51, wherein the molar ratio of $(R_2O+RO)/P_2O_5$ is greater than or equal to 1.

Clause 54 of the present disclosure extends to:
The glass composition of clauses 50 or 51, wherein the molar ratio of $(R_2O+RO)/P_2O_5$ is less than or equal to 1.

Clause 55 of the present disclosure extends to:
The glass composition of clauses 50 or 51, wherein the molar ratio of $R_2O/(R_2O+RO)$ is greater than 0.25.

Clause 56 of the present disclosure extends to:
The glass composition of any of clauses 51-55, wherein $P_2O_5$ is in the amount of 25 mol % to 35 mol %.

Clause 57 of the present disclosure extends to:
The glass composition of any of clauses 51-56, wherein $Nb_2O_5$ is in the amount of 15 mol % to 30 mol %.

Clause 58 of the present disclosure extends to:
The glass composition of any of clauses 51-57, wherein $R_2O$ is $Na_2O$, $Li_2O$, $K_2O$, or any combination thereof.

Clause 59 of the present disclosure extends to:
The glass composition of any of clauses 51-58, wherein $R_2O$ comprises $Na_2O$ in the amount of 1 mol % to 35 mol %.

Clause 60 of the present disclosure extends to:
The glass composition of any of clauses 51-59, wherein $R_2O$ comprises $Li_2O$ in the amount of 1 mol % to 15 mol %.

Clause 61 of the present disclosure extends to:

The glass composition of any of clauses 51-60, wherein $R_2O$ comprises $K_2O$ in the amount of 1 mol % to 10 mol %.

Clause 62 of the present disclosure extends to:
The glass composition of any of clauses 50-61, wherein $R_2O$ comprises $Na_2O$ in the amount of 1 mol % to 15 mol %, $Li_2O$ in the amount of 1 mol % to 15 mol %, and $K_2O$ in the amount of 1 mol % to 10 mol %.

Clause 63 of the present disclosure extends to:
The glass composition of any of clauses 51-62, wherein RO is CaO, BaO, MgO, SrO, or any combination thereof.

Clause 64 of the present disclosure extends to:
The glass composition of any of clauses 51-63, wherein RO comprises BaO in the amount of 1 mol % to 25 mol %.

Clause 65 of the present disclosure extends to:
The glass composition of any of clauses 51-64, wherein RO comprises CaO in the amount of 1 mol % to 20 mol %.

Clause 66 of the present disclosure extends to:
The glass composition of any of clauses 51-65, wherein RO comprises MgO in the amount of 1 mol % to 15 mol %.

Clause 67 of the present disclosure extends to:
The glass composition of any of clauses 51-66, wherein RO comprises SrO in the amount of 1 mol % to 30 mol %.

Clause 68 of the present disclosure extends to:
The glass composition of any of clauses 51-67, wherein RO comprises BaO in the amount of 1 mol % to 20 mol % and CaO in the amount of 1 mol % to 20 mol %.

Clause 69 of the present disclosure extends to:
The glass composition of any of clauses 51-68, wherein RO comprises BaO in the amount of 1 mol % to 20 mol %, CaO in the amount of 1 mol % to 20 mol %, and SrO in the amount of 1 mol % to 20 mol %.

Clause 70 of the present disclosure extends to:
The glass composition of any of clauses 51-69, wherein the composition further comprises $TiO_2$ and/or $WO_3$, wherein the amount of $Nb_2O_5$, an amount of $TiO_2$ and/or an amount $WO_3$, or any combination thereof, sums to 20 mol % to 40 mol %.

Clause 71 of the present disclosure extends to:
The glass composition of any of clauses 51-70, wherein the composition further comprises $TiO_2$ in an amount of 1 mol % to 30 mol %.

Clause 72 of the present disclosure extends to:
The glass composition of any of clauses 51-71, wherein the composition further comprises $WO_3$ in an amount of 1 mol % to 15 mol %.

Clause 73 of the present disclosure extends to:
The glass composition of any of clauses 51-72, wherein the composition further comprises $Al_2O_3$ in an amount of 1 mol % to 5 mol %.

Clause 74 of the present disclosure extends to:
The glass composition of any of clauses 51-73, wherein the composition further comprises $CeO_2$ in an amount of 0.001 mol % to 1.0 mol %.

Clause 75 of the present disclosure extends to:
The glass composition of any of clauses 51-74, wherein the glass composition does not include any of $SiO_2$, $Al_2O_3$, MgO, $TiO_2$.

Clause 76 of the present disclosure extends to:
The glass composition of any of clauses 51-75, wherein the glass composition comprises $Nb_2O_5$ in the amount of 30 mol % to 40 mol %, $TiO_2$ in the amount of 5 mol % to 15 mol %, $P_2O_5$ in an amount of 20 mol % to 35 mol %, ZnO in the amount of 1 mol % to 15 mol %, RO in the amount of 5 mol % to 40 mol %, where RO is BaO, CaO, SrO, or any combination thereof, and $R_2O$ in the amount of 1 mol % to 35 mol %, where $R_2O$ is $Na_2O$, $Li_2O$, $K_2O$, or any combination thereof.

Clause 77 of the present disclosure extends to:
The glass composition of clause 50, wherein the composition comprises
at least one alkali metal oxide ($R_2O$) in an amount of 5 mol % to 35 mol %;
wherein the glass composition does not include $B_2O_3$ or an alkaline earth metal oxide (RO).

Clause 78 of the present disclosure extends to:
The glass composition of clause 77, wherein $P_2O_5$ is in the amount of 25 mol % to 35 mol %.

Clause 79 of the present disclosure extends to:
The glass composition of clauses 77 or 78, wherein $Nb_2O_5$ is in the amount of 15 mol % to 30 mol %.

Clause 80 of the present disclosure extends to:
The glass composition of any of clauses 77-79, wherein $R_2O$ is $Na_2O$, $Li_2O$, $K_2O$, or any combination thereof.

Clause 81 of the present disclosure extends to:
The glass composition of any of clauses 77-80, wherein $R_2O$ comprises $Na_2O$ in the amount of 1 mol % to 35 mol %.

Clause 82 of the present disclosure extends to:
The glass composition of any of clauses 77-81, wherein $R_2O$ comprises $Li_2O$ in the amount of 1 mol % to 15 mol %.

Clause 83 of the present disclosure extends to:
The glass composition of any of clauses 77-82, wherein $R_2O$ comprises $K_2O$ in the amount of 1 mol % to 10 mol %.

Clause 84 of the present disclosure extends to:
The glass composition of any of clauses 77-83, wherein the composition further comprises $TiO_2$ in an amount of 1 mol % to 30 mol %.

Clause 85 of the present disclosure extends to:
The glass composition of any of clauses 77-84, wherein the composition further comprises $WO_3$ in an amount of 1 mol % to 15 mol %.

Clause 86 of the present disclosure extends to:
The glass composition of any of clauses 77-85, wherein $R_2O$ comprises $Na_2O$ in the amount of 1 mol % to 15 mol %, $Li_2O$ in the amount of 1 mol % to 15 mol %, and $K_2O$ in the amount of 1 mol % to 10 mol %.

Clause 87 of the present disclosure extends to:
The glass composition of any of clauses 77-86, wherein the molar ratio of $R_2O$ to $P_2O_5$ is greater than or equal to 1.

Clause 88 of the present disclosure extends to:
The glass composition of any of clauses 77-87, wherein the molar ratio of $R_2O$ to $P_2O_5$ is less than or equal to 1.

Clause 89 of the present disclosure extends to:
The glass composition of any of clauses 77-88, wherein the glass composition comprises $Nb_2O_5$ in the amount of 30 mol % to 40 mol %, $TiO_2$ in the amount of 5 mol % to 15 mol %, $P_2O_5$ in an amount of 20 mol % to 35 mol %, ZnO in the amount of 1 mol % to 15 mol %, and $R_2O$ in the amount of 1 mol % to 35 mol %, where $R_2O$ is $Na_2O$, $Li_2O$, $K_2O$, or any combination thereof.

Clause 90 of the present disclosure extends to:
The glass composition of clause 50, wherein the composition comprises
at least one alkaline earth metal oxide (RO) in an amount of 5 mol % to 40 mol %; and
wherein the glass composition does not include $B_2O_3$ or an alkali metal oxide ($R_2O$).

Clause 91 of the present disclosure extends to:
The glass composition of clause 90, wherein $P_2O_5$ is in the amount of 25 mol % to 35 mol %.

Clause 92 of the present disclosure extends to:
The glass composition of clauses 90 or 91, wherein $Nb_2O_5$ is in the amount of 15 mol % to 30 mol %.

Clause 93 of the present disclosure extends to:
The glass composition of any of clauses 90-92, wherein RO is CaO, BaO, MgO, SrO, or any combination thereof.

Clause 94 of the present disclosure extends to:
The glass composition of any of clauses 90-93, wherein RO comprises BaO in the amount of 1 mol % to 25 mol %.

Clause 95 of the present disclosure extends to:
The glass composition of any of clauses 90-94, wherein RO comprises CaO in the amount of 1 mol % to 20 mol %.

Clause 96 of the present disclosure extends to:
The glass composition of any of clauses 90-95, wherein RO comprises MgO in the amount of 1 mol % to 15 mol %.

Clause 97 of the present disclosure extends to:
The glass composition of any of clauses 90-96, wherein RO comprises SrO in the amount of 1 mol % to 30 mol %.

Clause 98 of the present disclosure extends to:
The glass composition of any of clauses 90-97, wherein RO comprises BaO in the amount of 1 mol % to 20 mol % and CaO in the amount of 1 mol % to 20 mol %.

Clause 99 of the present disclosure extends to:
The glass composition of any of clauses 90-98, wherein RO comprises BaO in the amount of 1 mol % to 20 mol %, CaO in the amount of 1 mol % to 20 mol %, and SrO in the amount of 1 mol % to 20 mol %.

Clause 100 of the present disclosure extends to:
The glass composition of any of clauses 90-99, wherein the composition further comprises $TiO_2$ in an amount of 1 mol % to 30 mol %.

Clause 101 of the present disclosure extends to:
The glass composition of any of clauses 90-100, wherein the composition further comprises $WO_3$ in an amount of 1 mol % to 15 mol %.

Clause 102 of the present disclosure extends to:
The glass composition of any of clauses 90-101, wherein the molar ratio of RO to $P_2O_5$ is greater than or equal to 1.

Clause 103 of the present disclosure extends to:
The glass composition of any of clauses 90-101, wherein the molar ratio of RO to $P_2O_5$ is less than or equal to 1.

Clause 104 of the present disclosure extends to:
The glass composition of any of clauses 90-103, wherein the glass composition comprises $Nb_2O_5$ in the amount of 30 mol % to 40 mol %, $TiO_2$ in the amount of 5 mol % to 15 mol %, $P_2O_5$ in an amount of 20 mol % to 35 mol %, ZnO in the amount of 1 mol % to 15 mol %, and RO in the amount of 5 mol % to 40 mol %, where RO is BaO, CaO, SrO, or any combination thereof.

Clause 105 of the present disclosure extends to:
The glass composition of any of clauses 1-104, wherein the glass composition has a glass thermal stability index of greater than or equal to 200° C.

Clause 106 of the present disclosure extends to:
The glass composition of any of clauses 1-104, wherein the glass composition has a glass thermal stability index of greater than or equal to 225° C.

Clause 107 of the present disclosure extends to:
The glass composition of any of clauses 1-104, wherein the glass composition has a glass thermal stability index of less than zero.

Clause 108 of the present disclosure extends to:
The glass composition of any of clauses 1-104, wherein the glass composition has a refractive index of at least 1.70 at 588 nm at 25° C.

Clause 109 of the present disclosure extends to:
The glass composition of any of clauses 1-104, wherein the glass composition has a refractive index of at least 1.75 at 588 nm at 25° C.

Clause 110 of the present disclosure extends to:
The glass composition of any of clauses 1-104, wherein the glass composition has a refractive index of 1.70 to 2.00 at 588 nm at 25° C.

Clause 111 of the present disclosure extends to:
The glass composition of any of clauses 1-104, wherein the glass composition has a density of less than or equal to 4 g/cm$^3$.

Clause 112 of the present disclosure extends to:
The glass composition of any of clauses 1-104, wherein the glass composition has an Abbe number of at least 20.

Clause 113 of the present disclosure extends to:
The glass composition of any of clauses 1-104, wherein the glass composition has an Abbe number of from 20 to 40.

Clause 114 of the present disclosure extends to:
The glass composition of any of clauses 1-104, wherein the glass composition has a coefficient of thermal expansion of from 6.0 ppm/° C. to 12 ppm/° C.

Clause 115 of the present disclosure extends to:
The glass composition of any of clauses 1-104, wherein the glass composition has an annealing point of 450° C. to 750° C.

Clause 116 of the present disclosure extends to:
The glass composition of any of clauses 1-104, wherein the glass composition has a softening point of 575° C. to 850° C.

Clause 117 of the present disclosure extends to:
The glass composition of any of clauses 1-104, wherein the glass composition has an internal liquidus temperature of 875° C. to 1,200° C.

Clause 118 of the present disclosure extends to:
The glass composition of any of clauses 1-104, wherein the glass composition has a Young's modulus of 50 GPa to 110 GPa.

Clause 119 of the present disclosure extends to:
The glass composition of any of clauses 1-104, wherein the glass composition is a glass sheet, powder, bead, fiber, or three-dimensional scaffold.

An optical article comprising the glass composition of any of clauses 1-104.

Throughout this publication, various publications are referenced. The disclosures of these publications in their entireties are hereby incorporated by reference into this application in order to more fully describe the methods, compositions, and compounds herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed:

1. A glass composition comprising:
   (a) $P_2O_5$ in an amount of 15 mol % to 40 mol %; and
   (b) $Nb_2O_5$ in an amount of 10 mol % to 50 mol %; and
   (c) $TiO_2$ in an amount of 15 mol % to 30 mol %; and
   (d) alkali metal oxide ($R_2O$) selected from the group consisting of $Li_2O$, $Na_2O$, $K_2O$, $Rb_2O$, and $Cs_2O$ in an amount of 5 mol % to 25 mol %, wherein the alkali metal oxide ($R_2O$) comprises at least two of $Li_2O$, $Na_2O$, and $K_2O$, wherein the alkali metal oxide ($R_2O$) comprises less than 20 mol % $Na_2O$ when $Na_2O$ is present; and
   (e) alkaline earth metal oxide (RO) selected from the group consisting of MgO, CaO, SrO, and BaO in an amount of 5 mol % to 30 mol %, wherein the alkaline earth metal oxide (RO) comprises at least two of CaO, SrO, and BaO; and wherein the glass composition does not include $WO_3$, ZnO, and $B_2O_3$; and wherein the glass composition has a molar ratio of $(R_2O+RO)/P_2O_5$ greater than or equal to 1.

2. The glass composition of claim 1, wherein the amount of $P_2O_5$ is 20 mol % to 30 mol %.

3. The glass composition of claim 1, wherein the amount of $Nb_2O_5$ is 15 mol % to 25 mol %.

4. The glass composition of claim 1, wherein the amount of $TiO_2$ is 19 mol % to 27 mol %.

5. The glass composition of claim 1, wherein the amount of $Nb_2O_5$ is 15 mol % to 25 mol % and the amount of $TiO_2$ is 15 mol % to 25 mol %.

6. The glass composition of claim 1, wherein the alkaline earth metal oxide (RO) comprises BaO in the amount of 1 mol % to 25 mol % and CaO in the amount of 1 mol % to 25 mol %.

7. The glass composition of claim 1, wherein the alkali metal oxide ($R_2O$) comprises $Na_2O$ in the amount of 1 mol % to 15 mol %, $Li_2O$ in the amount of 1 mol % to 15 mol %, and $K_2O$ in the amount of 1 mol % to 10 mol %, and the alkaline earth metal oxide (RO) comprises BaO in the amount of 1 mol % to 25 mol % and CaO in the amount of 1 mol % to 25 mol %.

8. The glass composition of claim 1, wherein the glass composition has a refractive index of at least 1.85 at 588 nm at 25° C.

9. The glass composition of claim 1, wherein the glass composition has a density of less than or equal to 3.8 g/cm3.

10. The glass composition of claim 1, wherein the glass composition has an internal liquidus temperature of 875° C. to 1,200° C.

11. A glass composition comprising:
(a) $P_2O_5$ in an amount of 15 mol % to 40 mol %; and
(b) $Nb_2O_5$ in an amount of 10 mol % to 50 mol %; and
(c) $TiO_2$ in an amount of 15 mol % to 30 mol %; and
(d) alkali metal oxide ($R_2O$) selected from the group consisting of $Li_2O$, $Na_2O$, $K_2O$, $Rb_2O$, and $Cs_2O$ in an amount of 5 mol % to 25 mol %, wherein the alkali metal oxide ($R_2O$) comprises at least one of $Li_2O$ and $K_2O$ in an amount of at least 1 mol %; and
(e) alkaline earth metal oxide (RO) selected from the group consisting of MgO, CaO, SrO, and BaO in an amount of 5 mol % to 30 mol %, wherein the alkaline earth metal oxide (RO) comprises at least two of CaO, SrO, and BaO; and wherein the glass composition does not include $WO_3$, ZnO, and $B_2O_3$; and wherein the glass composition has a molar ratio of $(R_2O+RO)/P_2O_5$ greater than or equal to 1.

12. The glass composition of claim 11, wherein the amount of $P_2O_5$ is 20 mol % to 30 mol %.

13. The glass composition of claim 11, wherein the amount of $Nb_2O_5$ is 15 mol % to 25 mol %.

14. The glass composition of claim 11, wherein the amount of $TiO_2$ is 19 mol % to 27 mol %.

15. The glass composition of claim 11, wherein the alkali metal oxide ($R_2O$) comprises at $Li_2O$ in an amount of at least 1 mol % and $K_2O$ in an amount of at least 1 mol %.

16. The glass composition of claim 11, wherein the amount of $Nb_2O_5$ is 15 mol % to 25 mol % and the amount of $TiO_2$ is 15 mol % to 25 mol %.

17. The glass composition of claim 11, wherein the alkaline earth metal oxide (RO) comprises BaO in the amount of 1 mol % to 25 mol % and CaO in the amount of 1 mol % to 25 mol %.

18. The glass composition of claim 11, wherein the alkali metal oxide ($R_2O$) comprises $Na_2O$ in the amount of 1 mol % to 15 mol %, $Li_2O$ in the amount of 1 mol % to 15 mol %, and $K_2O$ in the amount of 1 mol % to 10 mol %, and the alkaline earth metal oxide (RO) comprises BaO in the amount of 1 mol % to 25 mol % and CaO in the amount of 1 mol % to 25 mol %.

* * * * *